(12) United States Patent
Kawano et al.

(10) Patent No.: US 6,288,984 B1
(45) Date of Patent: Sep. 11, 2001

(54) OPTICAL PICKUP

(75) Inventors: Noriyuki Kawano; Kouichi Ogura; Yoshio Saito; Mitsuru Kinouchi; Nobuo Uekusa; Hiroyuki Matsuura, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/576,907

(22) Filed: May 23, 2000

Related U.S. Application Data

(63) Continuation of application No. 08/994,560, filed on Dec. 19, 1997, now Pat. No. 6,084,834, which is a continuation of application No. 08/888,232, filed on Jul. 3, 1997, now Pat. No. 5,877,904, which is a division of application No. 08/813,314, filed on Mar. 10, 1997, now abandoned, and a division of application No. 08/810,340, filed on Feb. 27, 1997, now Pat. No. 5,724,337, which is a continuation of application No. 08/330,671, filed on Oct. 28, 1994, now abandoned.

(30) Foreign Application Priority Data

| Oct. 29, 1993 | (JP) | 5-271595 |
| Nov. 22, 1993 | (JP) | 5-292006 |
| Dec. 1, 1993 | (JP) | 5-301689 |
| Dec. 22, 1993 | (JP) | 5-346418 |

(51) Int. Cl.$^7$ .................................................. G11B 7/00
(52) U.S. Cl. ........................................................ 369/44.14
(58) Field of Search ........................... 369/44.14, 44.15, 369/44.16, 44.17, 44.22

(56) References Cited

U.S. PATENT DOCUMENTS

| 5,132,534 | * | 7/1992 | Namigawara | 369/44.14 |
| 5,488,594 | * | 1/1996 | Kobayashi et al. | 369/44.14 |
| 5,706,272 | * | 1/1998 | Ezawa | 369/44.14 |

FOREIGN PATENT DOCUMENTS

| 05-020703 | 1/1993 | (JP) . | |
| 5-217174 | * | 9/1993 | (JP) | 369/44.14 |

* cited by examiner

*Primary Examiner*—Nabil Hindi
(74) *Attorney, Agent, or Firm*—Oblon, Spivak, McClelland, Maier & Neustadt, P.C.

(57) ABSTRACT

An optical pickup comprises an objective-lens driving device including a movable section provided with an objective lens, a focusing coil, and tracking coils, and a fixed section provided with a single magnetic circuit having a magnetic gap, the focusing coil and the tracking coils being disposed in the magnetic gap. The point of application of a tracking-driving force, the point of application of a result force of focusing-driving forces occurring in and outside the magnetic gap, and the position of the center of gravity of the movable section are made to substantially coincide with each other. In addition, the objective lens and the magnetic circuit are disposed within an area of a window in a lower shell of an optical disk. Further, a through hole for accommodating a lower portion of a yoke of the magnetic circuit is provided in a mounting base on which the objective-lens driving device is mounted. An inclining fulcrum and a height adjusting means for inclining the objective-lens driving device about the inclining fulcrum are provided in the vicinities of the through hole.

3 Claims, 18 Drawing Sheets

I

OPTICAL PICKUP

This application is a continuation of Ser. No. 08/994,560 filed Dec. 19, 1997 now U.S. Pat. No. 6,084,834, which is a continuation of Ser. No. 08/888,232, filed Jul. 3, 1997 now U.S. Pat. No. 5,877,904, which is a division of Ser. No. 08/813,314, filed Mar. 10, 1997 abandoned, and a division of Ser. No. 08/810,340 filed Feb. 27, 1997 U.S. Pat. No. 5,724,337, which is a continuation of Ser. No. 08/330,671 filed Oct. 28, 1994 abandoned.

BACKGROUND OF THE INVENTION

1. Field of the Invention

The present invention relates to an optical pickup for recording and reproducing information with respect to an optical disk. More particularly, the present invention relates to an objective-lens driving device and a mechanism for adjusting the inclination of an objective lens which are aimed at making the optical pickup compact and thin and stabilizing the driving of the objective lens in both a focusing direction and a tracking direction.

2. Description of the Related Art

In general, an optical pickup is comprised of an objective-lens driving device having an objective lens and an optical system block for transmitting and receiving light with respect to the objective lens, and is structured such that the objective-lens driving device is mounted on a mounting base of the optical system block.

To accurately effect the recording and reproduction of information with respect to an optical disk, it is necessary to accurately set the optical axis of the objective lens perpendicular to the disk surface.

For this reason, a mechanism for adjusting the inclination of an objective lens is conventionally known (e.g., Unexamined Japanese Patent Application (Kokai) No. 62-287443) which is arranged as follows: As shown in FIG. 1, a spherically convex mounting surface 103 is made to project from a bottom surface 102a of an objective-lens driving device 102 having an objective lens 101. In addition, as shown in FIG. 2, a spherically concave mounting surface 106 is formed in a mounting base 105 of an optical system block 104, the spherically convex mounting surface 103 is fitted in the spherically concave mounting surface 106, and the inclination of the objective lens 101 is made adjustable with respect to the center (fulcrum) 107 of a sphere formed by the spherically convex mounting surface 103 and the spherically concave mounting surface 106 by means of height adjusting screws 108.

However, since the spherically convex mounting surface 103, the spherically concave mounting surface 106, and the height-adjusting screws 108 are disposed between the objective-lens driving device 102 and the mounting base 105 of the optical system block 104, the thicknesswise dimension becomes large, thereby constituting a hindrance to the attempt to make the optical pickup thin.

In addition, to accurately effect the recording and reproduction of information with respect to an optical disk, it is necessary to prevent the occurrence of unwanted resonance. To prevent the occurrence of such unwanted resonance, in a conventional objective-lens driving device 201A shown in the perspective view in FIG. 3, the position of the center of gravity of a movable section 204, which has an objective lens 202, a focusing coil 203A for a focusing direction Z, and a pair of tracking coils 203B for a tracking direction Y, is aligned with an optical axis 205, and the central axes of the focusing coil 203A and the tracking coils 203B are aligned with the optical axis 205 (e.g., Unexamined Japanese Patent Application (Kokai) No. 2-230522).

The optical pickup having this arrangement is capable of preventing the occurrence of unwanted resonance, but it is necessary to dispose a light source, a reflecting mirror, a light-receiving element, and the like below the objective-lens driving device to effect the recording and reproduction of information. Hence, it has been difficult to make the optical pickup compact and thin.

To make the objective-lens driving device compact and thin, in a conventional objective-lens driving device 201B shown in the exploded perspective view in FIG. 4, the central axes of a focusing coil 208A and a pair of tracking coils 208B are not aligned with the optical axis 205, and the focusing coil 208A and the tracking coils 208B are disposed in a magnetic gap 207 provided in a single magnetic circuit 206 (e.g., Unexamined Japanese Patent Application (Kokai) Nos. 4-102235 and 4-103038).

In addition, in the objective-lens driving device disclosed in Unexamined Japanese Patent Application (Kokai) 4-103038, to accurately drive the movable section in the direction of the optical axis (focusing direction), a focusing-driving force which is provided outside the magnetic gap is minimized, so as to prevent an unnecessary force, such as moment, from acting in the movable section. It has been thought that this focusing-driving force occurring outside the magnetic gap, i.e., the leakage flux density, should be suppressed to as low a level as possible partly for preventing interference with metallic parts such as a motor disposed in the vicinity of the objective-lens driving device.

In addition, although the conventional objective-lens driving device 201B shown in FIG. 4 is capable of making the optical pickup compact and thin, there is a drawback in that, if an attempt is made to adjust the position of the center of gravity to either one of the driving points, the other driving point is offset from the position of the center of gravity, so that unwanted resonance occurs on the offset side.

FIG. 5A shows a schematic arrangement of an optical disk apparatus portion in a magneto-optic recording/reproducing system, in which an optical disk 301 is provided with an optical pickup 304 having a magnetic head 302 on one side and an objective lens 303 on the other side. The magnetic head 302 and the optical pickup 304 are driven in the radial direction of the optical disk 301 by a head driving device 305 and a feed motor 306, respectively, and the optical disk 301 is rotated by a spindle motor 307. Among such optical disk apparatuses, those of a type in which the optical disk 301 is covered with a cartridge 308 for the purpose of protecting the optical disk 301 have come to be marketed in recent years. This cartridge-type optical disk is arranged as follows: As shown in FIG. 5B, the optical disk 301 is rotatably accommodated in a space formed between an upper shell 308a and a lower shell 308b, and the shells 308a and 308b are provided with windows 308c and 308d, respectively. When the optical disk 301 is not in use, the windows 308c and 308d are closed by a shutter 308e, and, during recording or reproduction, the shutter 308e is moved laterally to open the windows 308c and 308d and insert the magnetic head 302 and the objective lens 303 into the windows.

In the conventional optical pickup 304, as described in, for example, Unexamined Japanese Patent Application (Kokai) 61-139945, a circuit for driving the objective lens 303 in the focusing direction and the tracking direction is disposed at a position other than that below the objective lens 303, whereby a free space is formed below the objective lens 303, and a reflecting mirror is disposed at that position, thereby making the overall optical pickup 304 thin.

With such a conventional apparatus, as shown in FIG. 6A, the optical disk 301 and the objective lens 303 are opposed to each other with an interval $L_{33}$ therebetween so that the optical axis of the objective lens 303 aligns with a central portion, as viewed in the rotating direction of the disk, of the window 308d of the lower shell 308b. In this arrangement, however, since a magnetic circuit 309 for effecting the positional adjustment of the objective lens 303 in the focusing and tracking directions is disposed outside the window 308d, there arises a need to provide a gap $L_{31}$ between a lower surface of the lower shell 308b and an upper surface of a yoke 310 constituting the magnetic circuit 309. As a result, the distance $L_{32}$ between the lower surface of the lower shell 308b and the lower surface of the magnetic circuit 309 becomes large, thereby constituting a hindrance to making the optical pickup 304 thin and compact.

FIG. 7 shows an exploded perspective view of a conventional objective-lens driving device (Unexamined Japanese Patent Application (Kokai) No. 3-212826).

A conventional objective-lens driving device 401 shown in the drawing is arranged as follows: A lens holder 403 with an objective lens 402 affixed thereto is cantilevered by being soldered onto a printed circuit board 409 in which four wires 404 inserted in an intermediate member 405 are secured to the intermediate member 405. The intermediate member 405 is mounted on a yoke base 406.

Incidentally, the printed circuit board 409 and the four wires 404 are electrically connected to each other. Electric current is allowed to flow across a focusing coil 407A and a pair of tracking coils 407B, which are arranged in the holder 403, via these four wires 404, to thereby drive the objective lens 402 in the focusing direction Z and the tracking direction Y.

To accurately effect the recording and reproduction of information with respect to the optical disk, it is necessary to prevent the occurrence of unwanted resonance.

For this reason, as shown in FIG. 8, a damping-member accommodating portion 405a is formed in the intermediate member 405, and a gel damping member 408 is filled in the accommodating portion 405a.

However, as for the conventional objective-lens driving device 401, since the intermediate member 405 is attached to the yoke base 406, and a printed circuit board 409 is secured to the intermediate member 405 by means of screws or the like, the number of component parts used is large. Hence, there has been a problem in that if the respective component parts are fixed by means of an adhesive, the number of assembling steps increases, so that the fabrication is not facilitated.

In addition, if the printed circuit board 409 is secured to the intermediate member 405 by means of screws, there have been cases where both ends of the printed circuit board 409 at portions remote from the wires 404 become lifted off due to changes in temperature and aged deterioration, as shown in FIG. 9. Hence, the four wires 404 are respectively deflected or conversely pulled, and the supporting balance becomes deteriorated, thereby resulting in changes in the angle of the optical axis of the objective lens 402 and unwanted resonance. Further, in cases where the yoke base 406 and the intermediate member 405, and the intermediate member 405 and the printed circuit board 409 are secured separately, if the bottom surface of the yoke base 406 is set as an assembling reference plane A, as shown in FIG. 10, there has been a problem in that it is difficult to set a B surface of the printed circuit board 409 perpendicular to the reference plane A, thereby making it impossible to drive the objective lens 402 with high accuracy.

SUMMARY OF THE INVENTION

The present invention has been devised in view of the above-described circumstances, and it is an object of the present invention to provide a mechanism for adjusting the inclination of an objective lens which makes it possible to make an optical pickup thin.

Another object of the present invention is to provide an objective-lens driving device which makes it possible to make an optical pickup compact and thin and drive the objective lens stably in both the focusing direction and the tracking direction.

Still another object of the present invention is to provide a cartridge-type optical disk apparatus having a structure which makes it possible to make the optical disk apparatus thin and compact.

A further object of the present invention is to provide an objective-lens driving device which is easy to manufacture and is capable of driving the objective lens with high accuracy.

In accordance with a first aspect of the present invention, there is provided a mechanism for adjusting the inclination of an objective lens for use in an optical pickup including an objective-lens driving device, having an objective lens, and an optical system block for transmitting and receiving light with respect to the objective lens, the objective-lens driving device being mounted on a mounting base of the optical system block. In the adjusting mechanism, a recessed portion or a through hole portion is formed in the mounting base of the optical system block, a projecting portion of a bottom of the objective-lens driving device is accommodated in the recessed portion or the through hole portion, and an inclining fulcrum for inclining the objective lens and height adjusting means for inclining the objective-lens driving device about the inclining fulcrum are provided in vicinities of the recessed portion or the through hole portion of the mounting base.

In accordance with a second aspect of the present invention, there is provided a mechanism for adjusting the inclination of an objective lens for use in an optical pickup including an objective-lens driving device, having an objective lens and a yoke, and an optical system block for transmitting and receiving light with respect to the objective lens, the objective-lens driving device being mounted on a mounting base of the optical system block. In the adjusting mechanism, a movable plate with a substantially U-shaped cross section which is formed integrally with the yoke is provided, a recessed portion or a through hole portion is formed in the mounting base of the optical system block, a lower portion of the yoke formed integrally with the movable plate is accommodated in the recessed portion or the through hole portion, and an inclining fulcrum for inclining the objective lens and height adjusting means for inclining the objective-lens driving device about the inclining fulcrum are provided in vicinities of the recessed portion or the through hole portion of the mounting base.

In accordance with a third aspect of the present invention, in the mechanism for adjusting the inclination of an objective lens according to the second aspect of the invention, the height adjusting means includes an urging member for upwardly urging the objective-lens driving device from the mounting base of the optical system block, and a screw for tightening the objective-lens driving device against the mounting base of the optical system block.

In accordance with a fourth aspect of the present invention, there is provided an optical disk apparatus in which a magnetic circuit of the objective-lens driving device is disposed within a window area of a lower shell of the optical disk. In a case where such a structure is adopted, to prevent the demagnetization of the optical disk, it is preferred that optical disk-side opposite ends of a yoke constituting the magnetic circuit of the driving device for driving an objective lens be magnetically short-circuited by a magnetic member.

In accordance with a fifth aspect of the present invention, there is provided an optical disk apparatus in which opposite end portions, as viewed in a tracking direction, of an objective lens holder which are opposed to the disk are formed into inclined surfaces, so as to prevent the lens holder from colliding against an edge on the innermost peripheral side or outermost peripheral side of the window in the lower shell, and to prevent an increase in the vertical dimension of the lens holder. In addition, in the optical disk apparatus in which such inclined surfaces are formed at the opposite end portions, as viewed in the tracking direction, of the objective lens holder which are opposed to the disk, the magnetic circuit of the objective-lens driving device is preferably disposed within the window area of the lower shell of the optical disk, and a portion of the objective lens holder which opposes a side edge of the window in the lower shell is preferably formed into an inclined surface.

In accordance with a sixth aspect of the present invention, there is provided an objective-lens driving device comprising: a movable section including an objective lens, a focusing coil, and a tracking coil; and a fixed section which includes a single magnetic circuit having a magnetic gap and in which the focusing coil and the tracking coil are both disposed in the magnetic gap, wherein a point of application of a resultant force of a focusing-driving force generated by a magnetic flux in the magnetic gap and a reversely-oriented focusing-driving force generated outside the magnetic gap by a magnetic flux leaking from the magnetic gap is brought close to a point of application of a tracking-driving force by controlling an amount of leakage magnetic flux.

Furthermore, the weight of the movable section is distributed such that a position of a center of gravity of the movable section is located between the point of application of the tracking-driving force and the point of application of the resultant force of the focusing-driving forces.

In accordance with a seventh aspect of the present invention, there is provided an objective-lens driving device comprising: a movable section including an objective lens, a focusing coil, and a tracking coil; and a fixed section which including a single magnetic circuit having a magnetic gap, both of the coils being disposed in the magnetic gap, wherein a point of application of a tracking-driving force, a point of application of a resultant force of focusing-driving forces respectively occurring in and outside the magnetic gap, and a position of a center of gravity of the movable section are made to substantially coincide with each other.

In accordance with an eighth aspect of the present invention, there is provided an objective-lens driving device comprising: a movable section including an objective lens and a coil for generating a driving force in a predetermined direction; a resiliently supporting member serving as a path for supplying electric current to the coil and supporting the movable section in a cantilevered manner or on both sides thereof; a printed circuit board electrically connected to at least one fixed end side of the resiliently supporting member; and a base having a yoke for generating the driving force; and an intermediate member for fixing the printed circuit board and the base by molding in a state in which the printed circuit board and the base are positioned relative to each other.

In accordance with a ninth aspect of the present invention, in the objective-lens driving device according to the eighth aspect of the invention, the intermediate member has a guide hole for inserting the resiliently supporting member therethrough to connect the fixed end side of the resiliently supporting member, and a damping-member accommodating portion for accommodating a damping member for damping unwanted resonance of the movable section is formed in a vicinity of the guide hole.

In accordance with the mechanism for adjusting the inclination of an objective lens according to the first aspect of the invention, the fulcrum for inclining the objective lens and the height adjusting means are provided in the vicinities of the recessed portion or the through hole portion formed in the mounting base of the optical system block, and it is thereby possible to make the optical pickup thin.

In accordance with the mechanism for adjusting the inclination of an objective lens according to the second aspect of the invention, since the yoke and the movable plate are formed integrally, the optical pickup can be made thin, and since the yoke and the movable plate are formed integrally, the fabrication is facilitated.

In accordance with the mechanism for adjusting the inclination of an objective lens according to the third aspect of the invention, the objective-lens driving device can be inclined about the fulcrum for inclining the objective lens in accordance with the degree of tightening of the screw, thereby inclining the objective lens.

In accordance with the objective-lens driving device according to the fourth aspect of the invention, since the magnetic circuit is disposed within the window in the lower shell, the dimension between the lower surface of the magnetic circuit of the driving device and the lower surface of the lower shell can be reduced, thereby making it possible to obtain a thin device. In addition, according to the fifth aspect of the invention, since the radially opposite end portions of the objective lens holder, which are opposed to the disk, are formed into inclined surfaces, it is possible to make the lens holder thin.

In accordance with the objective-lens driving device according to the sixth aspect of the invention, since the point of application of the resultant force of focusing-driving forces respectively occurring in and outside the magnetic gap is brought close to the point of application of the tracking-driving force, their distances with respect to the position of the center of gravity of the movable section can both be reduced. Therefore, it is possible to easily prevent the occurrence of unwanted resonance in both the focusing direction and the tracking direction. Furthermore, since the position of the center of gravity of the movable section can be located between the point of application of the tracking-driving force and the point of application of the resultant force of the focusing-driving forces respectively occurring in and outside the magnetic gap, the distances between the position of the center of gravity of the movable section and the point of application of the resultant force and between the position of the center of gravity of the movable section and the point of application of the tracking-driving force are both made short. Therefore, it is possible to prevent the occurrence of unwanted resonance in both the focusing direction and the tracking direction.

In accordance with the objective-lens driving device according to the seventh aspect of the invention, the focusing coil and the tracking coils are disposed in the magnetic gap, so that the objective-lens driving device can be made compact and thin. In addition, since the point of application of the tracking-driving force and the position of the center of gravity of the movable section are made to substantially coincide with each other, it is possible to make the device compact and thin. Hence, it is possible to realize a stable servomechanism in which unwanted resonance does not occur in both the focusing direction and the tracking direction.

In accordance with the objective-lens driving device according to the eighth aspect of the invention, since the printed circuit board and the base are secured to each other by being positioned relative to each other when the intermediate member is formed by molding, a bonding process and a screw-tightening process can be omitted in assembling the printed circuit board, the base, and the intermediate member. Hence, the relative positional accuracy between the printed circuit board and the base can be improved.

In accordance with the objective-lens driving device according to the ninth aspect of the invention, since the damping member is accommodated in the damping-member accommodating portion, the damping member suppresses the vibration of the resiliently supporting member, thereby damping the unwanted resonance of the movable section.

DESCRIPTION OF THE PREFERRED EMBODIMENTS

Referring now to the accompanying drawings, a description will be given of the preferred embodiments of the present invention.

First Embodiment

Figure 11:
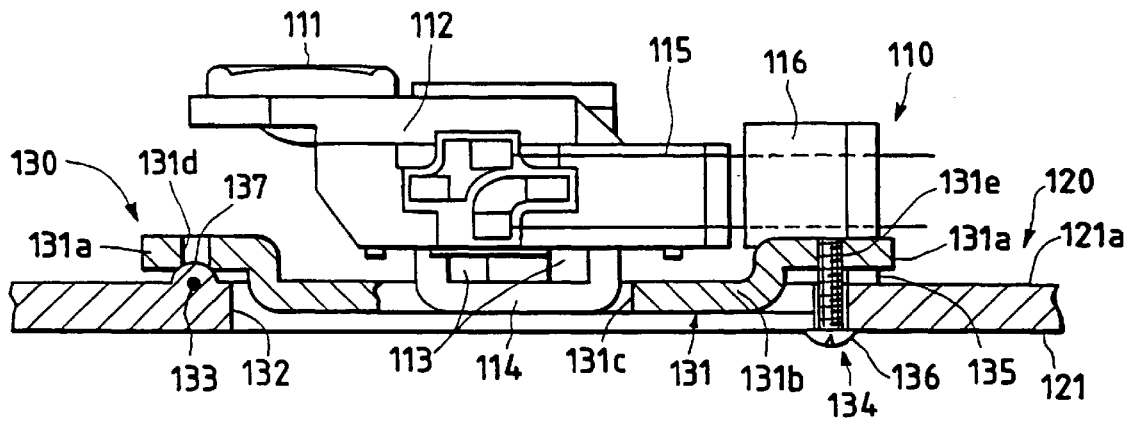
FIG. 11 is a cross-sectional view of an optical pickup in accordance with a first embodiment of the present invention, and illustrates one example of a mechanism for adjusting the inclination of an objective lens.
Figure 12:
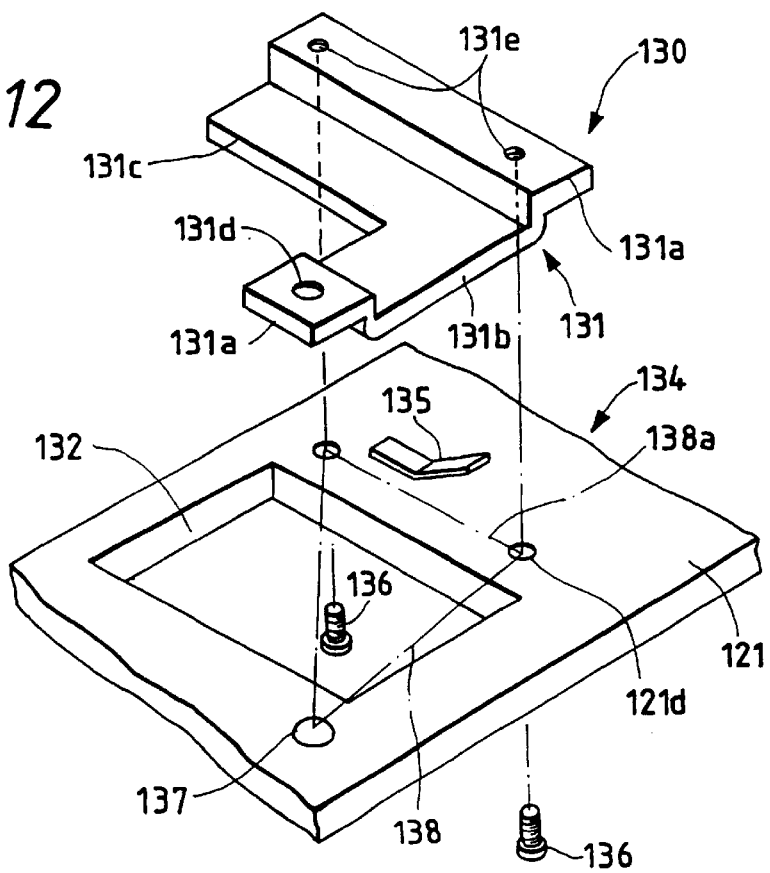
FIG. 12 is an exploded perspective view of the mechanism for adjusting the inclination of an objective lens.

FIG. 11 is a cross-sectional view of an optical pickup in accordance with a first embodiment of the present invention, and illustrates one example of a mechanism for adjusting the inclination of an objective lens. FIG. 12 is an exploded perspective view thereof.

First, a description will be given of an optical pickup to which a mechanism 130 for adjusting the inclination of an objective lens in accordance with this embodiment is applied.

As shown in FIG. 11, this optical pickup is comprised of an objective-lens driving device 110 having an objective lens 111 and an optical system block 120 for transmitting and receiving light to and from the objective lens 111, in addition to the mechanism 130 for adjusting the inclination of an objective lens. The objective-lens driving device 110 is disposed on a mounting base 121 of the optical system block 120.

The objective-lens driving device 110 has a lens holder 112 for holding the objective lens 111, an unillustrated driving coil for driving the lens holder 112 in the focusing direction and the tracking direction, a yoke 114 which constitutes a magnetic circuit together with a permanent magnet 113, and projects from the bottom side of the objective-lens driving device 110, and a supporting base 116 which also serves as a path for supplying electric current to the driving coil and supports the lens holder 112 side via a bundling member 115.

The optical system block 120 is provided with the mounting base 121 on which the objective-lens driving device 110 is disposed, and is further provided with an optical system which includes a light-beam generating source, such as a semiconductor laser, and optical elements, such as a beam splitter, as well as a light detecting element for receiving a reflected light beam. In this optical system block 120, a light beam is made incident upon the objective lens 111 from the light-beam generating source via the optical system, and a light spot is formed on the optical disk by the objective lens 111. The light beam reflected from the optical disk is received by the light detecting element via the optical system, and a light detection signal corresponding to the intensity of the reflected light beam thus received is outputted.

Next, a description will be given of the mechanism 130 for adjusting the inclination of an objective lens in accordance with this embodiment, which is used in the above-described optical pickup.

This mechanism 130 for adjusting the inclination of an objective lens has a movable plate 131 for fixedly disposing the objective-lens driving device 110, and a through hole portion 132 is formed in the mounting base 121 of the optical system block 120. A lower portion of the yoke 114 projecting from the bottom side of the objective-lens driving device 110 is accommodated in the through hole portion 132, and an inclining fulcrum 133 for inclining the objective lens 111 and a height adjusting means 134 for inclining the objective-lens driving device 110 about the inclining fulcrum 133 are provided in the vicinities of the through hole portion 132 of the mounting base 121.

The height adjusting means 134 is provided with an urging member 135, such as a leaf spring, for upwardly urging the objective-lens driving device 110 from the mounting base 121 side of the optical system block 120, as well as two height adjusting screws 136 for tightening the objective-lens driving device 110 toward the mounting base 121 side of the optical system block 120.

The movable plate 131 has a substantially U-shaped cross section for connecting collars 131a on both sides thereof and a bottom 131b. The supporting base 116 of the objective-lens driving device 110 is fixedly disposed on this movable plate 131. In addition, a notch 131c is formed in the bottom 131b of the movable plate 131 so that the yoke 114 of the objective-lens driving device 110 can enter the lower side. As a result, the thickness of the movable plate 131 and the thickness of the inclination adjusting mechanism 130 are not affected by the thickness of the optical pickup, thereby making it possible to reduce the thicknesswise dimension. In addition, one collar 131a of the movable plate 131 has a spherical-portion receiving hole 131d, and the other collar 131a has two female screws 131e for threadedly engaging with the height adjusting screws 136, respectively.

The spherical-portion receiving hole 131d, which is formed in the movable plate 131 and has a smaller diameter than a spherically convex portion 137, is received on the spherically convex portion 137 formed on the mounting base 121 of the optical system block 120. A lower edge of the spherical-member receiving hole 131d is made to abut against the surface of the spherically convex portion 137, thereby forming the inclining fulcrum 133.

Next, a description will be given of a method of adjusting the inclination in accordance with this embodiment.

First, after the objective-lens driving device 110 is assembled, the objective-lens driving device 110 is fixedly disposed on the movable plate 131. The yoke 114 of the objective-lens driving device 110 enters the lower side through the notch 131c formed in the movable plate 131 without interfering with the movable plate 131. The movable plate 131 is placed on the mounting base 121 of the optical system block 120. The bottom 131b of the movable plate 131 enters the lower side without interfering with the mounting plate 121 through the opening 132 formed in the mounting plate 121 of the optical system block 120. The lower edge of the spherical-member receiving hole 131d and the surface of the spherically convex portion 137 abut against each other, with the result that the fulcrum 133 for inclining the objective lens 111 is formed. Then, the height adjusting screws 136 are inserted through insertion holes 121d provided in the mounting base 121, and are made to threadedly engage with the female screws 131e of the movable plate 131. The movable plate 131 is set in a state in which it is pushed upwardly about the inclining fulcrum 133 by the urging member 135.

Here, as the degree of tightening of one or both of the two height adjusting screws 136 is adjusted, as required, the objective-lens driving device 110 is inclined about the inclining fulcrum 133 in accordance with the degree of tightening. Thus, it is possible to adjust the inclination of the objective lens 111 in the direction of the X-axis (jitter direction) and the direction of the Y-axis (tracking direction).

In accordance with this embodiment arranged as described above, since the inclining fulcrum 133 and the height adjusting means 134 are provided in the vicinities of the through hole portion 132 formed in the mounting base 121 of the optical system block 120, it is possible to make the optical pickup thin. Also, since the objective-lens driving device 110 is inclined about the inclining fulcrum 133 in accordance with the degree of tightening of the height adjusting screws 136, the adjustment of the inclination of the objective lens 111 can be effected easily. In addition, since the lower portion of the yoke 114 projecting from the bottom of the objective-lens driving device 110 is accommodated in the opening 132 formed in the mounting base 121 of the optical system block 120, the optical pickup can be made thin substantially by the portion of the thickness of the mounting base 121 of the optical system block 120. Further, since the arrangement provided is such that the inclination can be adjusted by one inclining fulcrum 133 and the two adjusting points, and the urging member 135 is disposed outside one side 138a, opposing the inclining fulcrum 133, of a triangle 138 formed by the three points, it is possible to appropriately pressurize the spherically convex portion 137 and realize the inclination of the optical axis in the X-axis direction and the Y-axis direction smoothly in a saved space.

Moreover, since the spherically convex portion 137 projects from the mounting base 121 of the optical system block 120, the spherically convex portion 137 can be formed integrally through die casting or injection molding, and the inclination of the optical axis in the X-axis direction and the Y-axis direction can be realized with a small number of component parts.

Figure 13:
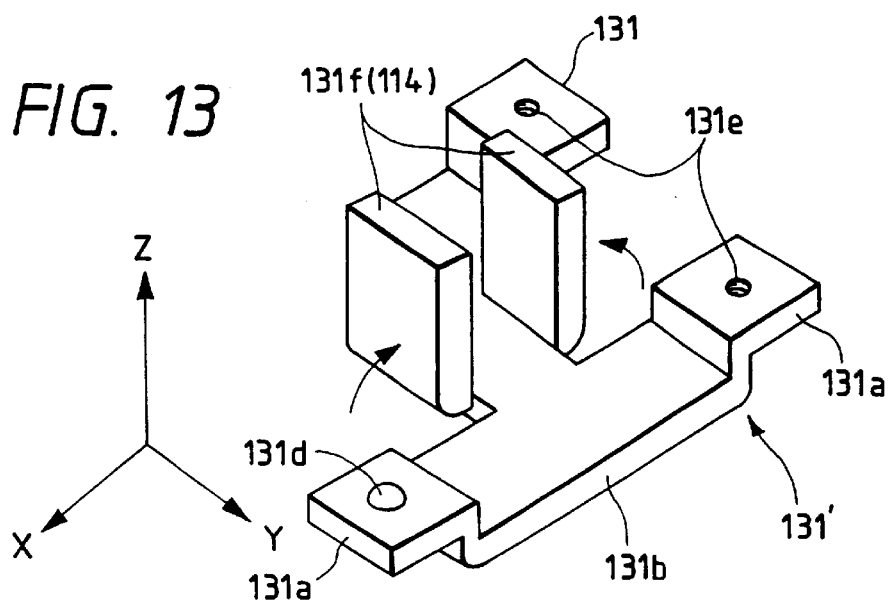
FIG. 13 is a perspective view illustrating another example of a movable plate shown in FIG. 12.

It should be noted that the present invention is not confined to the above-described embodiment, and various modifications are possible. For example, an arrangement may be provided such that, as shown in FIG. 13, the yoke (114) is formed by uprightly raising portions 131f of the bottom 131b of a movable plate 131', and the movable plate and the yoke are formed integrally by a metal-pressed component. In this case, the heightwise positions of the bottoms of the yoke (114) and the movable plate 131' can be set at the same level, so that the optical pickup can be made thinner and fabrication is facilitated. In addition, an arrangement may be alternatively provided such that a concave portion is formed in the mounting base 121, while a spherically convex portion is formed on the movable plate 131 or 131' so as to form the fulcrum for inclining the objective lens 111.

In accordance with the first embodiment detailed above, since the fulcrum for inclining the objective lens and the height adjusting means are provided in the vicinities of the recessed portion or the through hole portion formed in the mounting base of the optical system block, it is possible to make the optical pickup thin.

In addition, since the yoke and the movable plate are formed integrally, the optical pickup can be made thin, and the fabrication is facilitated.

Further, since the urging member and the screws are used, the objective-lens driving device can be inclined about the fulcrum for inclining the objective lens, so that the adjustment of the inclination of the objective lens can be effected easily.

Furthermore, since two or more adjustment screws are provided, adjustment in the jitter direction and the tracking direction becomes possible.

Also, the spherically convex portion constituting the inclining fulcrum is formed integrally with the mounting base, the fabrication of the mounting base is facilitated.

Second Embodiment

Next, a description will be given of a second embodiment.

Figure 14:
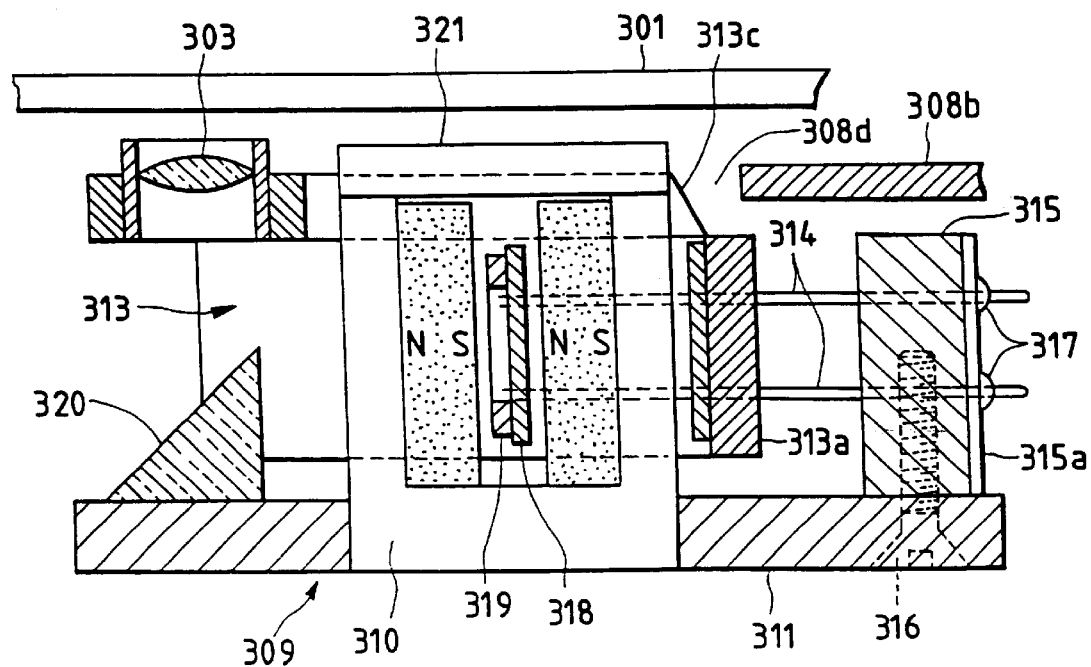
FIG. 14 is a vertical cross-sectional view illustrating an optical disk apparatus in accordance with a second embodiment of the present invention.
Figure 15:
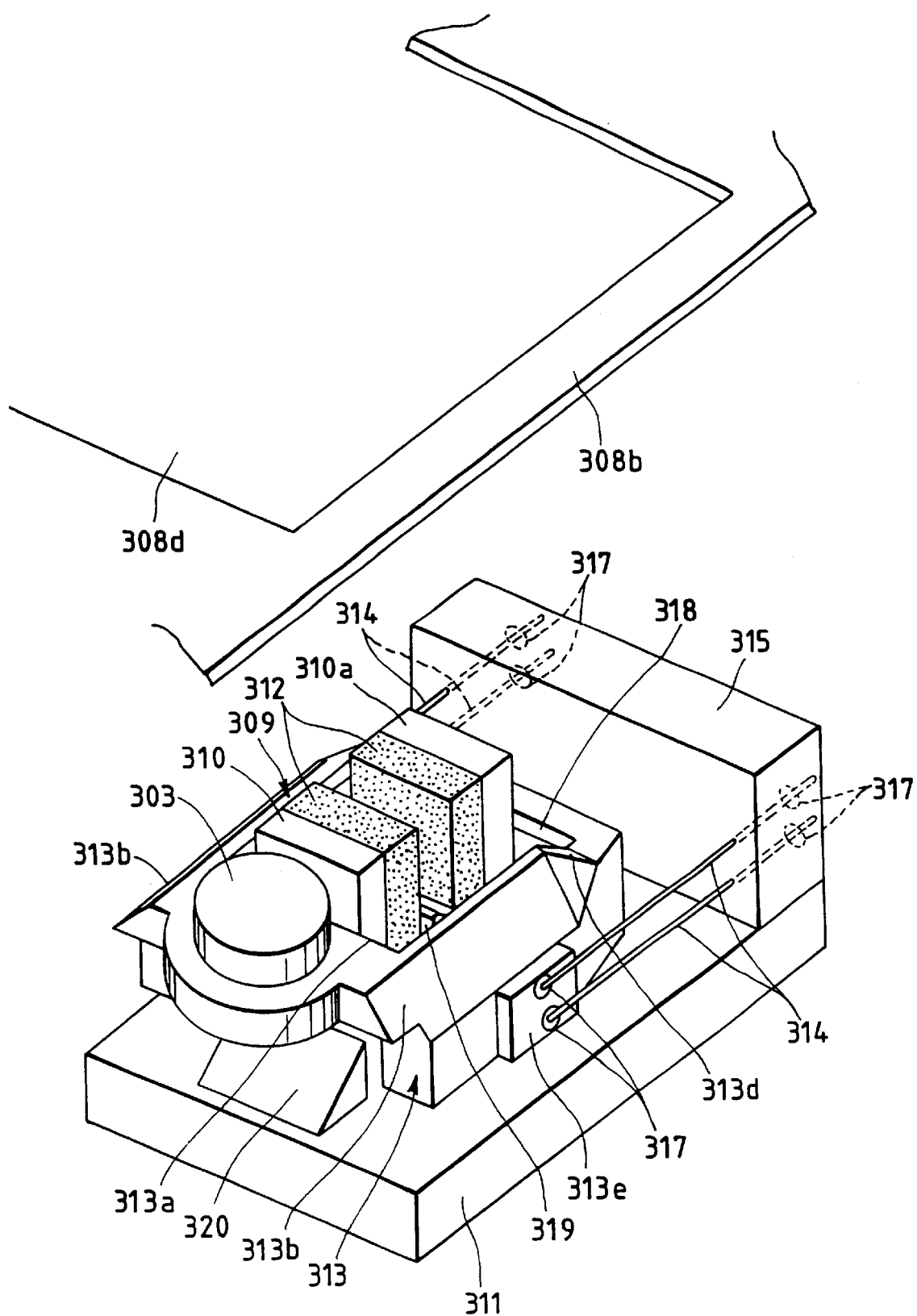
FIG. 15 is a perspective view of the optical disk apparatus shown in FIG. 14.
Figure 16:
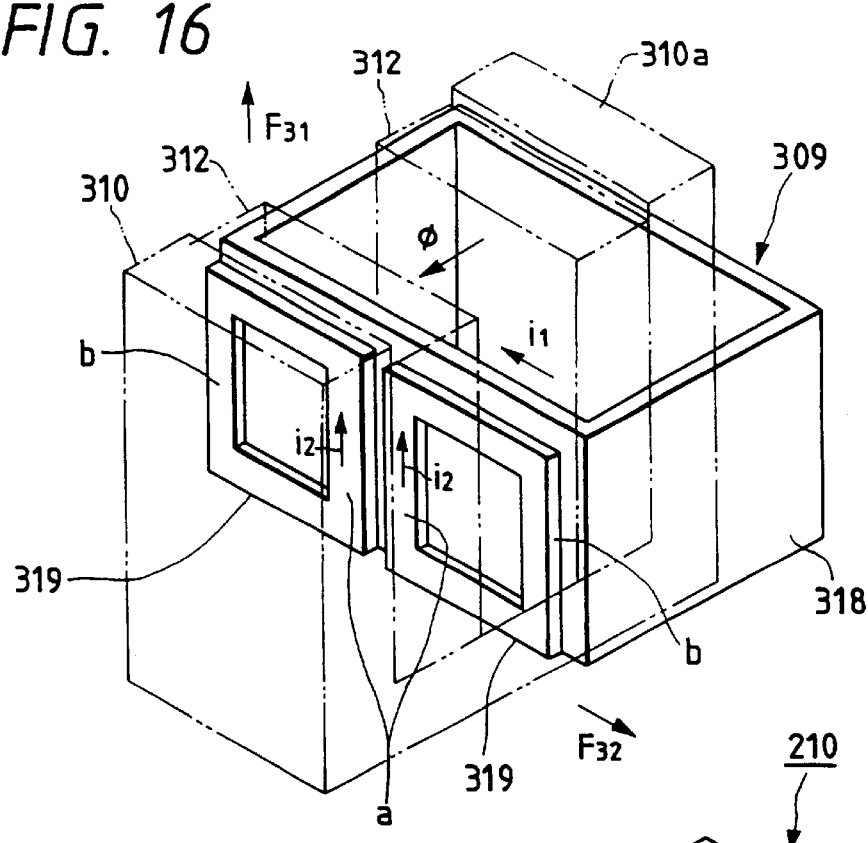
FIG. 16 is a perspective view illustrating a magnetic circuit of an objective-lens driving device in accordance with the second embodiment.

FIG. 14 is a vertical cross-sectional view illustrating an optical disk apparatus in accordance with a second embodiment of the present invention. FIG. 15 is a perspective view thereof. In FIGS. 14 and 15, reference numeral 311 denotes a base formed of a resin or the like, and a U-shaped yoke 310 constituting a magnetic circuit for driving the objective lens 303 as well as a reflecting mirror 320 are fixed on the base 311. Permanent magnets 312 are fixed on opposing surfaces of the yoke 310, respectively, and are magnetized in the left-and-right direction, as shown in FIG. 14. A support 315 formed of a resin is fixed at one end of the base 311 by means of screws 316, and the support 315 and a lens holder 313 are connected to each other by means of four wire springs 314. These wire springs 314 have their root portions penetrating the support 315. Proximal ends of the springs 314 are secured by soldering 317 to a printed circuit board 315a which is fixed to the support 315 by bonding or the like, while distal ends of the springs 314 are fixed by soldering 317 to a pair of printed circuit boards 313e which are respectively fixed to both sides of the lens holder 313 by bonding or the like. The lens holder 313 is arranged such that the objective lens 303 is attached to one end thereof and a remaining portion is formed as a frame 313a. The yoke 310 to which the permanent magnets are fixed is inserted in the frame 313a in such a manner as to be relatively movable. That is, as shown in the perspective view of FIG. 16, a focusing coil 318 is formed in a rectangular shape, a pair of tracking coils 319 is fixed on one surface thereof, and the focusing coil 318 is inserted and fixed in the frame 313a such that the focusing coil 318 surrounds one of the permanent magnets 312 and one column portion 310a to which it is fixed, with a predetermined distance. As shown in FIG. 16, the portion of the focusing coil 318 to which the tracking coils 319 are fixed is inserted between the pair of permanent magnets 312.

With respect to a magnetic circuit 309 of the device for driving the objective lens 303, if the current is allowed to flow across the focusing coil 318 in the direction of arrow i1, as shown in FIG. 16, a magnetic flux φ generated between the pair of permanent magnets 312 crosses the coil through which this current flows. As a result, the focusing coil 318, i.e., the lens holder 313, is urged in a direction in which it approaches an optical disk 301, as indicated by the arrow $F_{31}$, and the lens holder 313 becomes stationary where it balances with the resiliency of the wire springs 314. If the direction of the current is reversed, the lens holder 313 is urged in a direction in which it moves away from the optical disk 301. Meanwhile, if a current i2 is allowed to flow across vertically oriented portions a of the pair of tracking coils 319, the lens holder 313 is subjected to a force acting in the direction of the arrow $F_{32}$ (the tracking direction=the radial direction of the optical disk), and if the direction of the current is reversed, the direction of the acting force is also reversed. It should be noted that the tracking coils 319 are arranged in an area outside the area between the opposing portions of the pair of permanent magnets 312 so that the amount of the magnetic flux crossing at portions b on both sides of the tracking coils 319 is reduced.

Figure 6A:
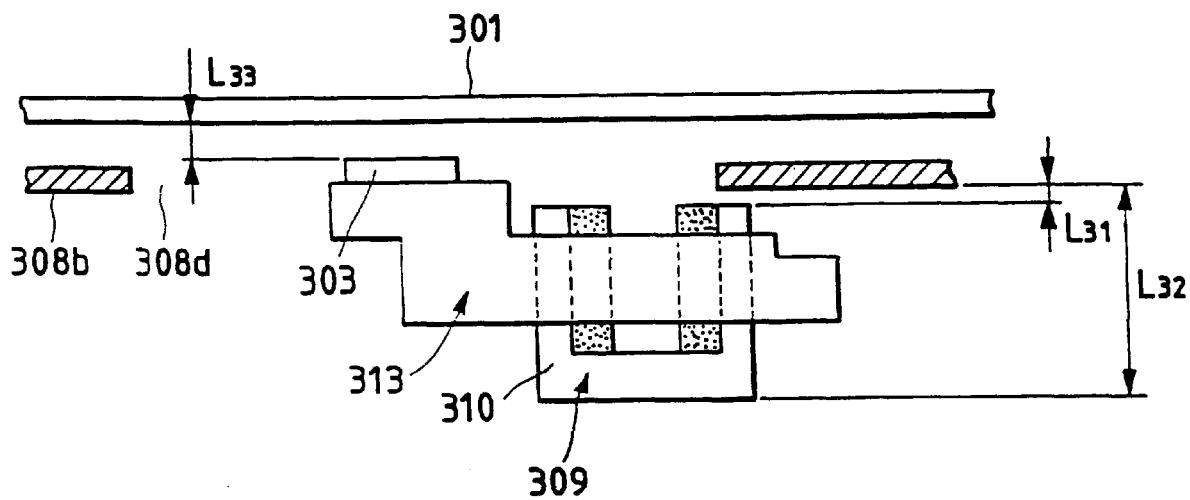
FIGS. 6A and 6B are diagrams of dimensional relationships among various parts in a conventional example and in this embodiment, respectively, in which the optical disk apparatuses are viewed in a tracking direction.
Figure 6B:
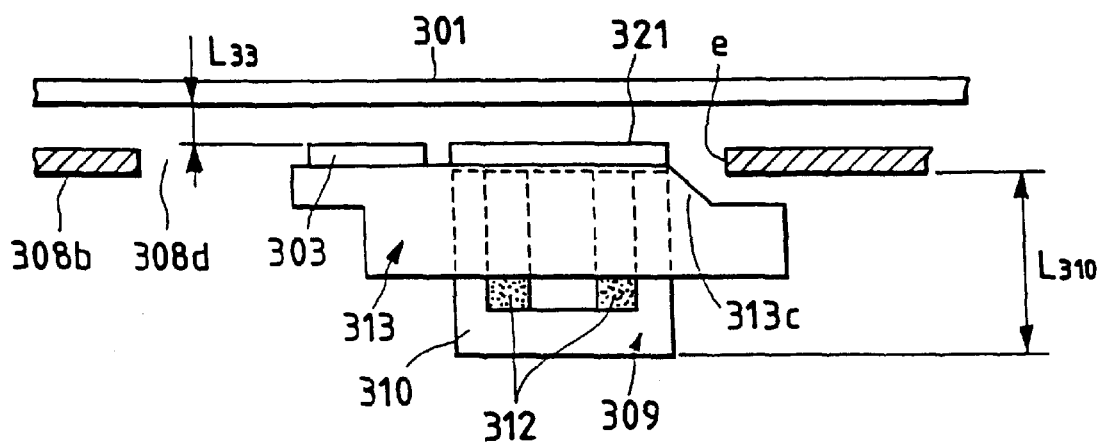
Figure 7:
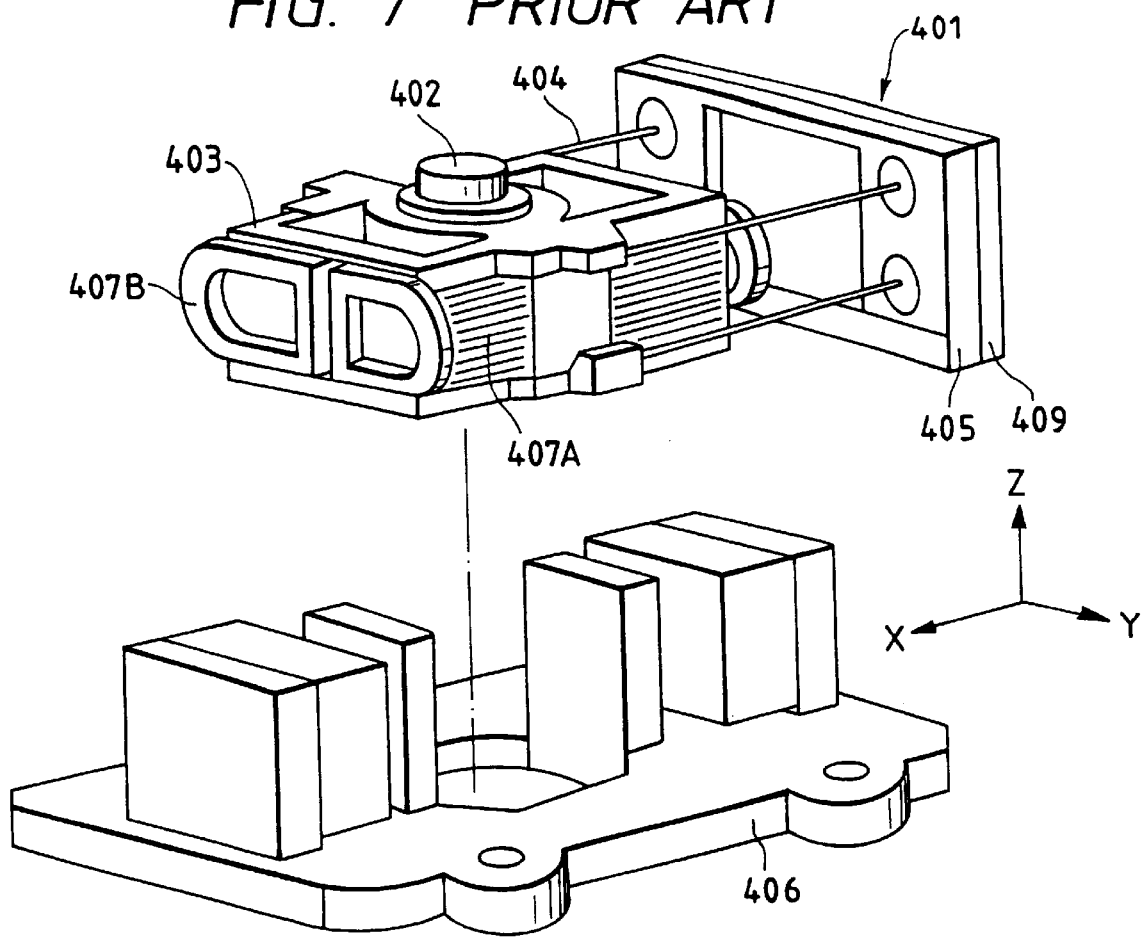
FIG. 7 is a is a perspective view of a conventional objective-lens driving device.
Figure 8:
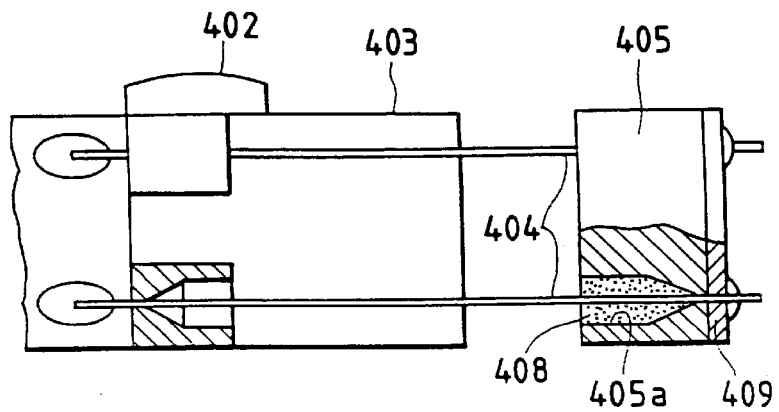
FIG. 8 is a side view illustrating a mechanism for preventing unwanted resonance.
Figure 9:
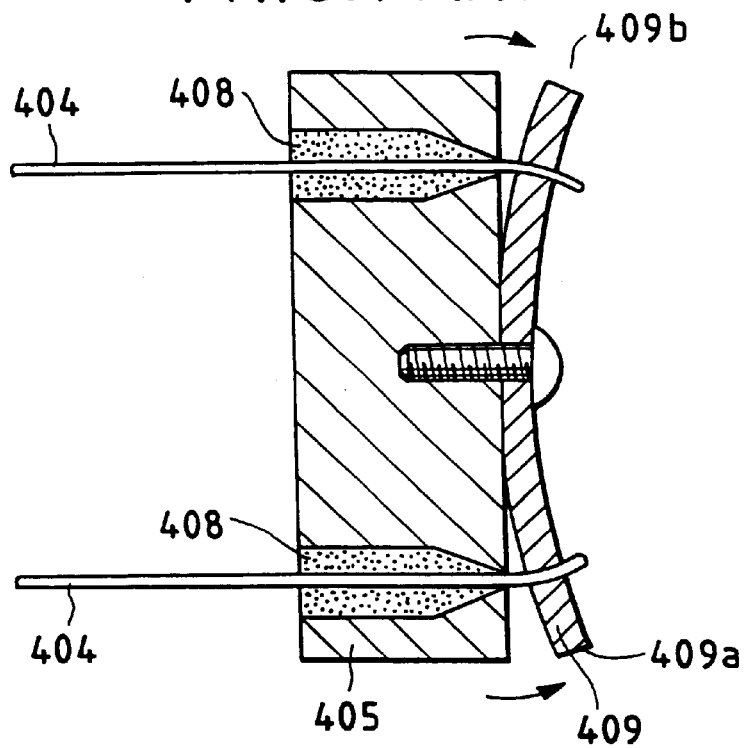
FIG. 9 is a cross-sectional view illustrating a conventional problem.
Figure 10:
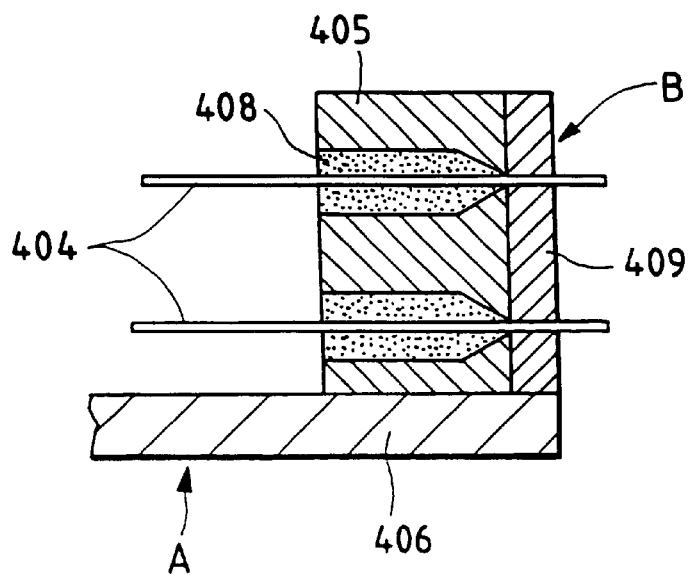
FIG. 10 is a cross-sectional view illustrating another conventional problem.

In the present invention, the magnetic circuit 309 of the device for driving the objective lens 303, together with the objective lens 303, is disposed within a window 308d of a lower shell 308b, as shown in FIG. 14. Since the magnetic circuit 309 is disposed within the area of the window 308d, as shown in FIG. 6B, it is possible to reduce the dimension $L_{310}$ from the lower surface of the lower shell 308b to the lower surface of the magnetic circuit 309, thereby making it possible to make the apparatus thin and compact. In this case, distal ends of the yoke 310 are magnetically short-circuited by a short-circuiting member 321 having high permeability, such as iron, so that the magnetically recorded surface of the optical disk 301 will not be demagnetized by the magnetic field generated by the permanent magnets 312.

Figure 17A:
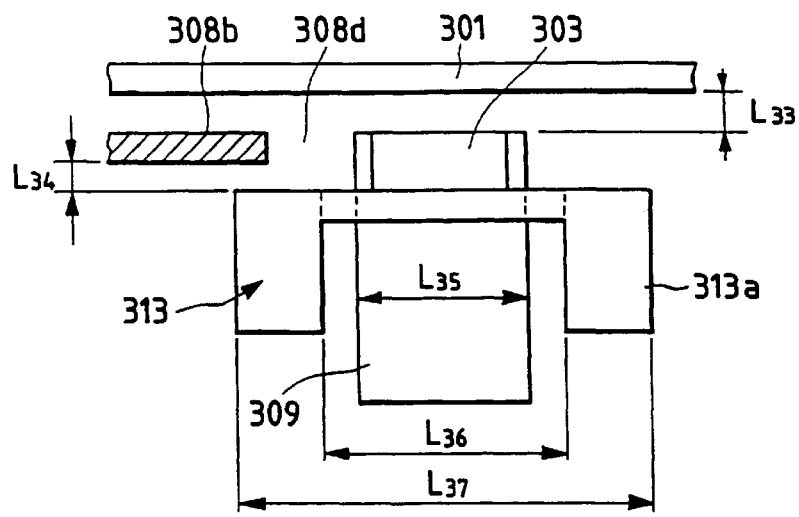
FIGS. 17A and 17B are diagrams of dimensional relationships among various parts on the outer peripheral side or inner peripheral side of the disk in a conventional example and a comparative example, respectively.

In addition, as shown in FIG. 15, opposite end portions 313b, as viewed in the tracking direction, of the lens holder 313 are formed into inclined surfaces, thereby making it possible to reduce the thickness of the lens holder 313. A description will be given of this point with reference to FIGS. 17A, 17B, and 18. As shown in FIG. 17A, the lens holder 313 requires the width $L_{35}$ of the magnetic circuit 309 (yoke 310) so as to drive the lens holder 313 in the focusing direction and the tracking direction. In addition, the lens holder requires mechanical leeway for moving in the tracking direction, i.e., an arbitrary dimension is required as the gap ($L_{36}-L_{35}$) between the width inside the frame 313a and the yoke 310. Furthermore, it is necessary to secure the width of the frame 313a of the lens holder 313. Consequently, a width $L_{37}$ which is substantially larger than the diameter of the objective lens 303 is required as a whole. In the lens holder 313 which requires such a width $L_{37}$, if the opposite end portions of the lens holder 313 as viewed in the radial direction of the optical disk are formed into square shapes in the conventional manner, in a case where the objective lens 303 is driven in the focusing direction in a state in which the objective lens 303 has been moved to the innermost peripheral side or outermost peripheral side of the optical disk 301, the lens holder 313 does not enter inside the window 308d, and collides against the lower surface of the lower shell 308b. This occurs due to the fact that the distance $L_{34}$ between the upper portion of the lens holder 313 and the lower shell 308b is smaller than the amount of movement in the upward direction for focusing, as shown in FIG. 17A. However, if this distance is made greater as indicated by $L_{38}$ in FIG. 17B, the distance $L_{39}$ between the lower surface of the lower shell 308b to the lower surface of the magnetic circuit 309 would become greater (if the working distance of the objective lens 303 is fixed).

Figure 17B:
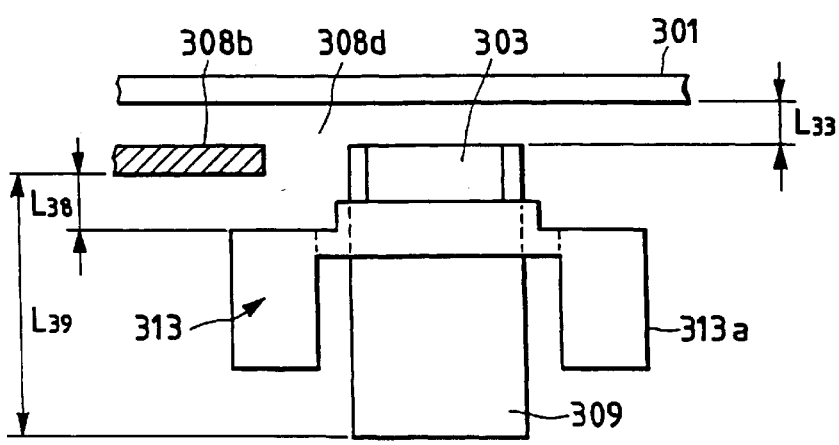
Figure 18:
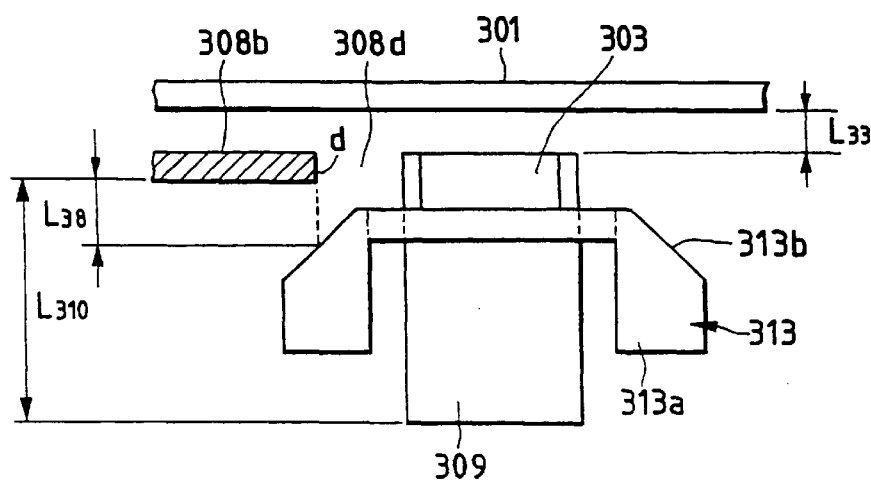
FIG. 18 is a diagram of dimensional relationships among various parts in accordance with the second embodiment.

In contrast, in this embodiment, as shown in FIG. 18, since the side surfaces 313b of the lens holder 313 are inclined, it is possible to reduce the thickness of the lens holder 313 without undermining the strength of the lens holder 313 while the vertical distance between the lens holder 313 and an edge d on the innermost peripheral side or outermost peripheral side of the window 308d is kept at the large distance $L_{38}$ in the same way as in FIG. 17B. As a result, it is possible to reduce the overall thickness $L_{310}$ from the lower surface of the lower shell 308b to the lower surface of the magnetic circuit 309.

As shown in FIGS. 14 and 6B, if a portion 313c of the lens holder 313 which opposes a side edge e of the window 308d in the lower shell 308b is formed into an inclined surface for a similar reason, it is possible to make the apparatus thin and compact for the same reason.

It should be noted that the arrangement of the magnetic circuit 309, the structure for supporting the lens holder 313, and the like in the above-described embodiment are only illustrative, and it goes without saying that various modifications are possible.

In accordance with the above-described second embodiment, in the cartridge-type optical disk apparatus, since the magnetic circuit of the objective-lens driving device is disposed inside the window area of the lower shell, it is possible to make the optical pickup thin and compact.

In addition, since the optical disk-side opposite ends of the yoke of the magnetic circuit of the objective-lens driving device are magnetically short-circuited by a magnetic member, the magnetically recorded surface of the optical disk is prevented from being demagnetized despite the fact that the magnetic circuit is brought into close proximity to the optical disk.

In addition, since the opposite end portions, as viewed in the tracking direction, of the objective lens holder which are opposed to the disk are formed into inclined surfaces, it is possible to make the apparatus thin and compact while securing the strength of the lens holder and mechanical leeway during movement in the focusing direction and the tracking direction.

Moreover, since the magnetic circuit of the objective-lens driving device is disposed within the window area of the lower shell of the optical disk, and a portion of the objective lens holder which opposes a side edge of the window in the lower shell is formed into an inclined surface, the apparatus can be made further thin and compact.

Third Embodiment

Hereafter, a description will be given of a third embodiment of the present invention with reference to the drawings.

Figure 19:
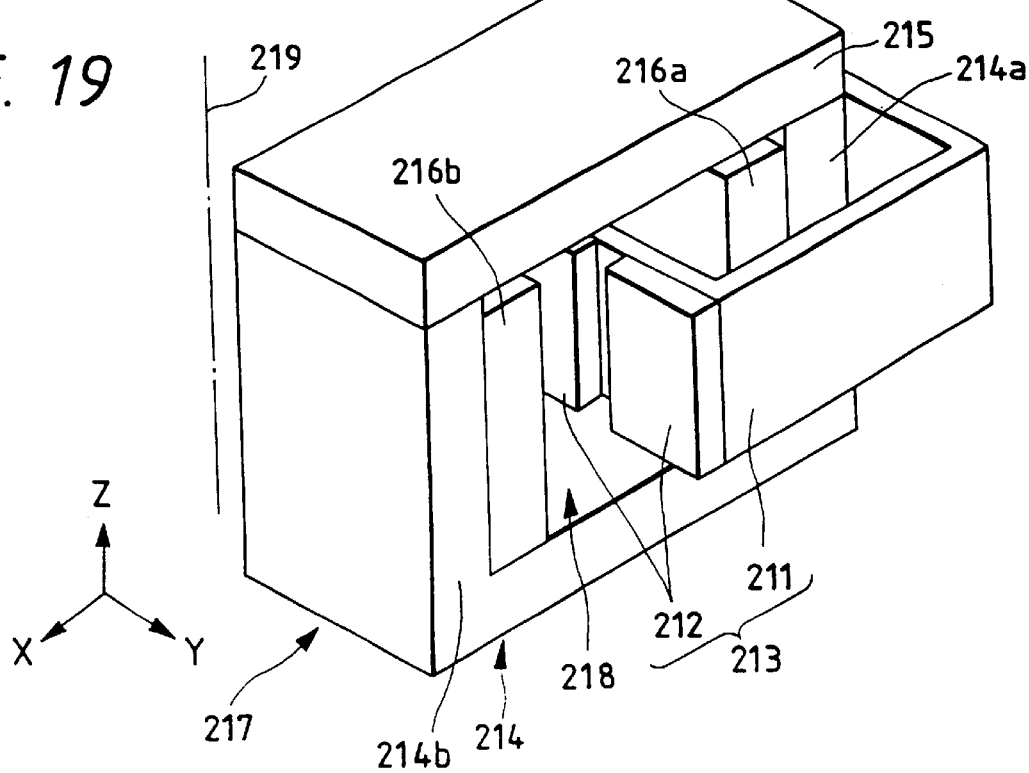
FIG. 19 is a perspective view of an essential portion of an objective-lens driving device in accordance with a third embodiment of the present invention.
Figure 20:
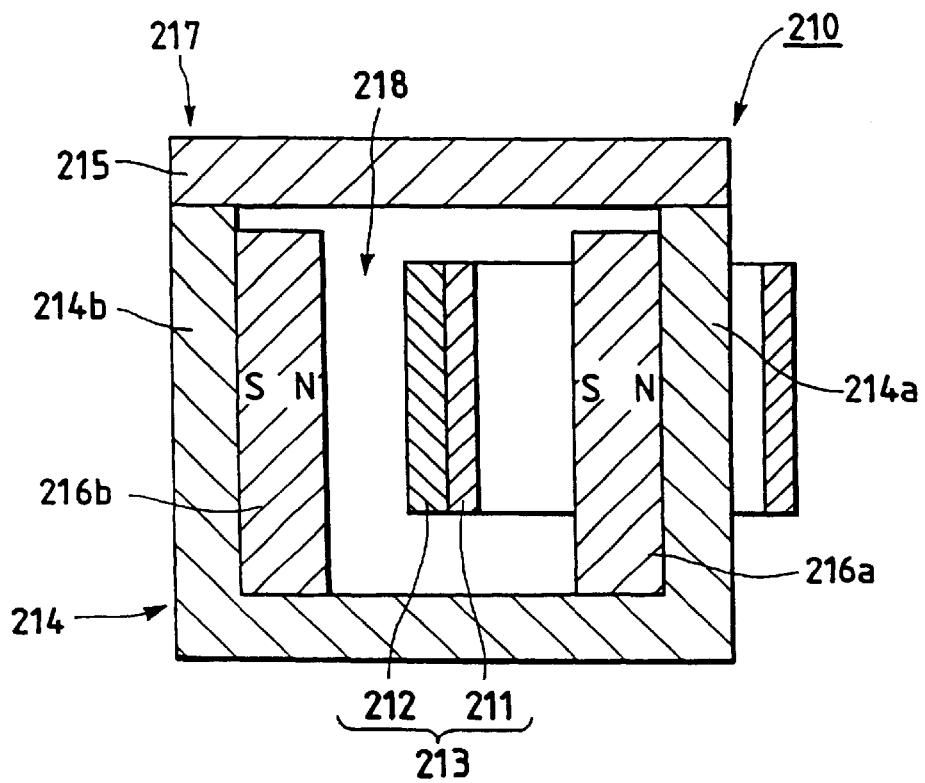
FIG. 20 is a vertical cross-sectional view of FIG. 20.
Figure 21:
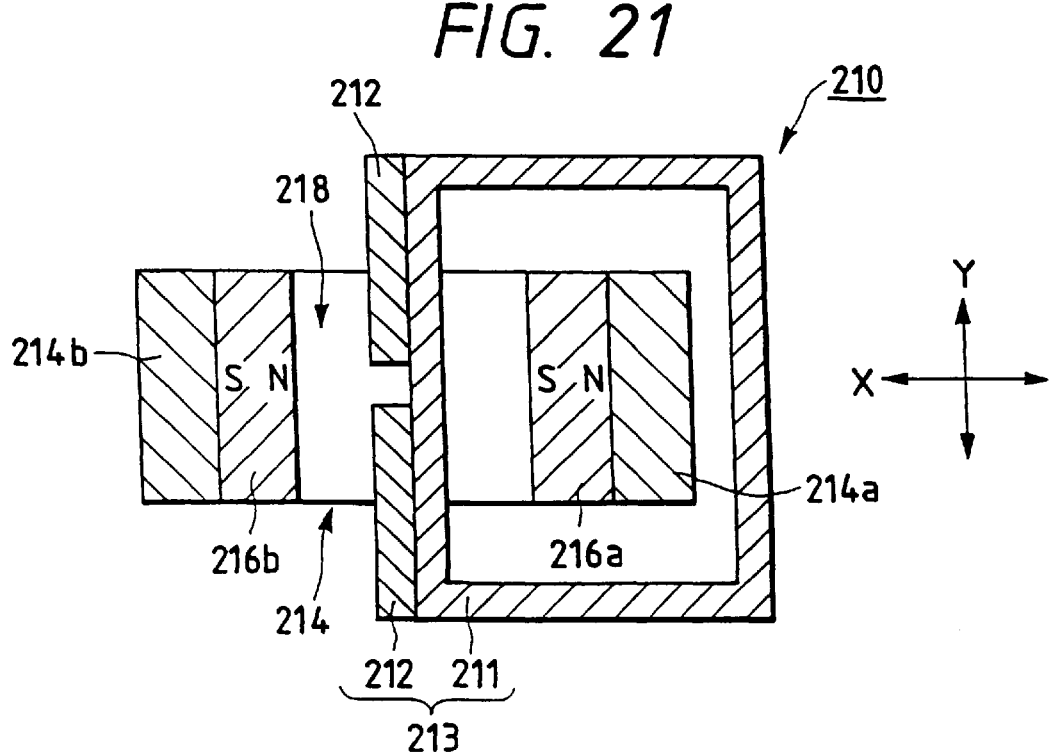
FIG. 21 is a horizontal cross-sectional view of FIG. 20.

FIG. 19 is a perspective view of an essential portion illustrating an example of the objective-lens driving device in accordance with the third embodiment of the present invention. FIG. 20 is a vertical cross-sectional view thereof, and FIG. 21 is a horizontal cross-sectional view thereof.

An objective-lens driving device 210 in the third embodiment is comprised of a movable section 213 including an unillustrated objective lens, an unillustrated lens holder for holding the objective lens, a focusing coil 211 secured to the lens holder, a pair of tracking coils 212, and the like; and a fixed section 217 which has a magnetic circuit constituted by a U-shaped yoke 214, an upper yoke 215, and a pair of magnets 216a and 216b, and supports the movable section 213 by means of unillustrated spring members serving as paths for supplying current to the respective coils 211 and 212 of the movable section 213.

The U-shaped yoke 214 of the fixed section 217 is formed with a U-shaped cross section such that a pair of a first leg 214a and a second leg 214b are opposed to each other. The upper yoke 215 is secured to distal end faces of the first and second legs 214a and 214b of the U-shaped yoke 214. The pair of magnets 216a and 216b are disposed on the respectively inner sides of the first and second legs 214a and 214b of the U-shaped yoke 214 so that different poles, i.e., the S pole and the N pole, are opposed to each other. A magnetic gap 218 is formed between the pair of magnets 216a and 216b.

The focusing coil 211 of the movable section 213 is formed by winding a coil member around its central axis such that its cross section becomes a hollow rectangle. The focus coil 211 is disposed around the first leg 214a of the U-shaped yoke 214 with a gap therebetween such that its central axis becomes parallel to an optical axis 219, and a portion of the focus coil 211 passes the magnetic gap 218. Consequently, if current is supplied to the focusing coil 211, the unillustrated lens holder moves in the focusing direction (in the direction of the optical axis) Z. In addition, each of the tracking coils 212 is wound in such a manner as to allow the current to flow in the focusing direction Z, and is secured on the magnetic gap 218 side of the focusing coil 211. As a result, if current is supplied to the tracking coils 212, the unillustrated lens holder moves in the perpendicular direction Y with respect to the optical axis 219.

Figure 22:
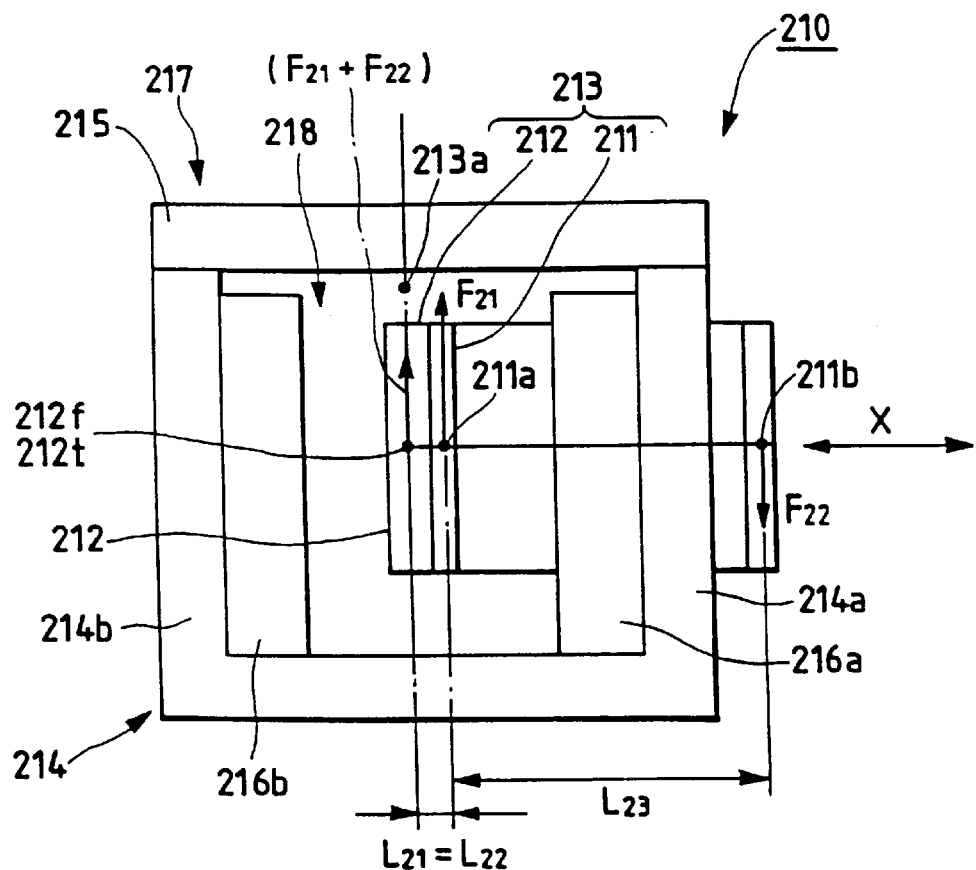
FIG. 22 is a diagram illustrating the relationships between various driving forces and the position of the center of gravity.

In the objective-lens driving device 210 of this embodiment, various parts are so designed that, as shown in FIG. 22, a point of application 212t of a tracking-driving force generated by the tracking coils 212, a point of application 212f of a resultant force ($F_{21}+F_{22}$) of an in-gap focusing-driving force $F_{21}$ occurring within the magnetic gap 218 and an outside-gap focusing-driving force $F_{22}$ occurring outside the magnetic gap 218 (on the outer side of the first leg 214a), and the position 213a of the center of gravity of the overall movable section 213 including the objective lens and the lens holder, substantially coincide with each other at a given point in a direction X tangential to the track (in a direction perpendicular to the focusing direction Z and the tracking direction Y).

Specifically, various parts are designed in accordance with the following technique. Namely, if it is assumed that the distance in the direction X tangential to the track between the position of the center of gravity 213a of the movable section 213 and a point of application 211a of the focusing-driving force $F_{21}$ occurring within the magnetic gap is $L_0$, that the distance between the point of application 212t of the tracking-driving force and the point of application 211a of the focusing-driving force $F_{21}$ occurring within the magnetic gap 218 is $L_{21}$, that the distance between the point of application 211a of the focusing-driving force $F_{21}$ occurring within the magnetic gap 218 and the resultant force ($F_{21}+F_{22}$) of the in-gap focusing-driving force $F_{21}$ and the outside-gap focusing-driving force $F_{22}$ is $L_{22}$, that the distance between the point of application 211a of the in-gap focusing-driving force $F_{21}$ and a point of application 211b of the outside-gap focusing-driving force $F_{22}$ is $L_{23}$, that the in-gap magnetic flux density occurring within the magnetic gap 218 is $B_1$, and that the outside-gap magnetic flux density (hereafter referred to leakage magnetic flux density) occurring in a portion where the outside-gap focusing-driving force $F_{22}$ acts is $B_2$, the following relationships hold:

$$L_{22}=F_{22} \cdot L_{23}/(F_{21}-F_{22})=B_2 \cdot L_{23}/(B_1-B_2) \tag{1}$$

The reason for this is that if the effective width L and the current I are assumed to be fixed, the driving force F is in a proportional relationship with the magnetic flux density B.

Accordingly, the values of $L_0$, $L_{21}$, $L_{22}$, $L_{23}$, $B_1$, and $B_2$ are selected in such a way that $L_{22}$ on the one hand, and $L_{21}$ and $L_0$ on the other, become substantially equal.

Consequently, since the point of application 212f of the resultant force ($F_{21}+F_{22}$), the point of application 212t of the tracking-driving force generated by the tracking coils 212, and the position 213a of the center of gravity of the overall movable section 213 substantially coincide with each other at a given point in the X direction, it is possible to prevent the occurrence of unwanted resonance.

Figure 23:
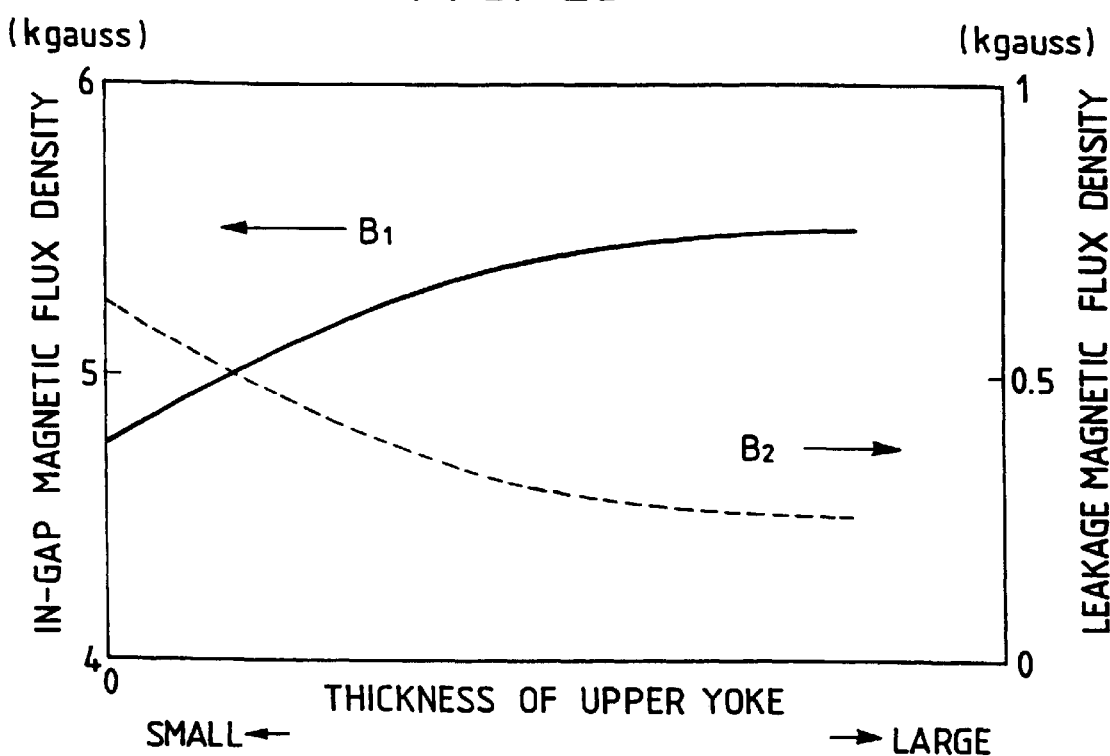
FIG. 23 is a graph illustrating the relationship between the thickness of an upper yoke on the one hand, and a in-gap magnetic flux density and a leakage magnetic flux density, on the other.
Figure 24:
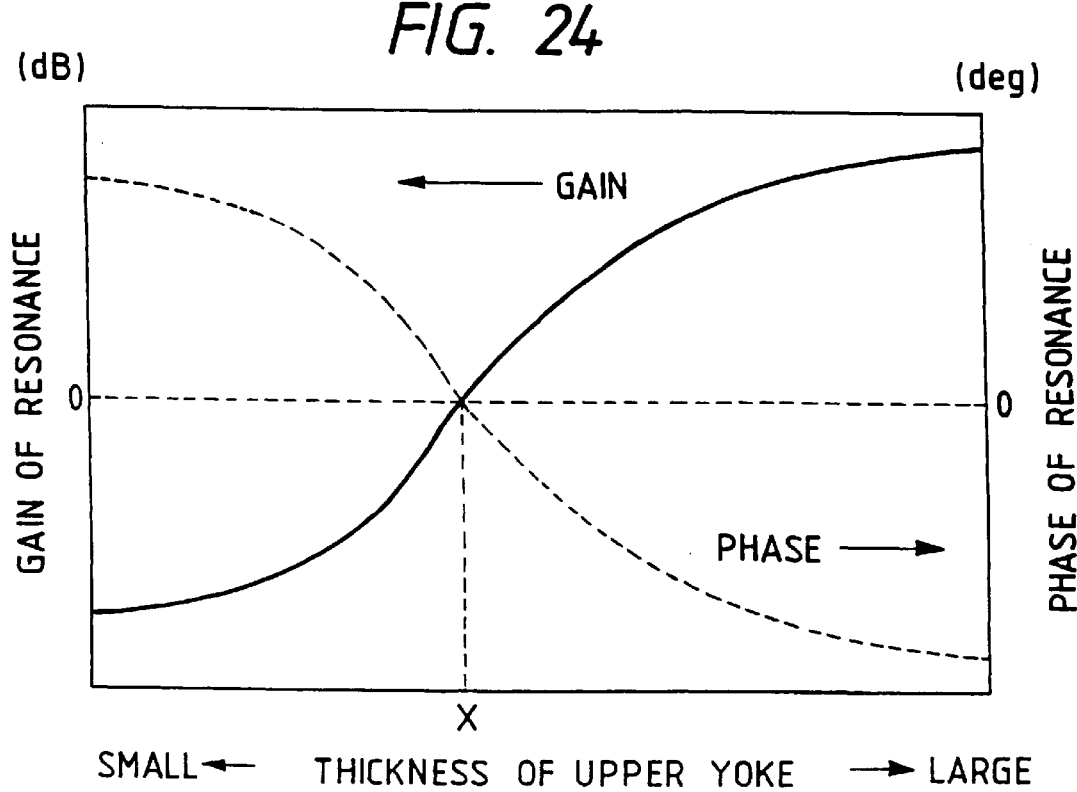
FIG. 24 is a graph illustrating the effect of the thickness of a U-shaped yoke with respect to pitching resonance in accordance with the third embodiment.

Referring also to FIGS. 23 and 24, a description will be given of the effects of the embodiment arranged as described above.

FIG. 23 is a graph illustrating the relationship between the thickness of the upper yoke 215 on the one hand, and the in-gap magnetic flux density $B_1$, and the leakage magnetic flux density (outside-gap magnetic flux density) $B_2$, on the other. FIG. 24 is a graph illustrating the effect of the thickness of the U-shaped yoke 214 with respect to the pitching resonance, and is a graph which illustrates the phase and the magnitude (gain) of resonance (pitching resonance) in a mode of rotation about the Y-axis.

According to this embodiment, since the focusing coil 211 and the tracking coils 212 are disposed within one magnetic gap 218, it is possible to make the device compact and thin.

Also, as is apparent from FIG. 23, the in-gap magnetic flux density $B_1$, and the leakage movable plate $B_2$ change with the thickness of the upper yoke 215, and the greater the thickness of the upper yoke 215, the greater the in-gap magnetic flux density $B_1$, becomes and the smaller the leakage magnetic flux density $B_2$ becomes. Accordingly, at an arbitrary distance $L_{23}$, the greater the thickness of the upper yoke 215, the smaller $L_{22}$ becomes, and the point of application 212f of the resultant force ($F_{21}+F_{22}$) approaches the point of application 211a of the in-gap focusing-driving force $F_{21}$. Therefore, in a case where $L_{21}$ and $L_{23}$ are fixed as dimensions, if the thickness of the upper yoke 215 is set to an appropriate value so that the values of $B_1$, and $B_2$ become such that $L_{21}=L_{22}$, the point of application 212t of the tracking-driving force, the point of application 212f of the resultant force ($F_{21}+F_2$) of the in-gap focusing-driving force $F_{21}$, and the outside-gap focusing-driving force $F_{22}$, and the position 213a of the center of gravity of the overall movable section 213 substantially coincide with each other at a given point in the X direction. Since the point of application 212t of the tracking-driving force and the position 213a of the center of gravity of the overall movable section 213 substantially coincide with each other, it is possible to prevent the occurrence of resonance about the Z-axis with the position 213a of the center of gravity set as the center. Since the point of application 212f of the resultant force ($F_{21}+F_{22}$) and the position 213a of the center of gravity of the movable section 213 substantially coincide with each other, it is possible to prevent the occurrence of resonance about the Y-axis with the position 213a of the center of gravity set as the center. Thus, by making active use of the outside-gap focusing-driving force $F_{22}$, which has conventionally been considered as being needed to be minimized, it becomes possible to prevent the occurrence of unwanted resonance in both the tracking direction Y and the focusing direction Z.

In addition, as is apparent from FIG. 24, if the thickness of the upper yoke 215 is set to an appropriate value, it is possible to prevent the occurrence of pitching resonance.

Also, although a measure against the focusing side is adopted in the objective-lens driving device disclosed in Unexamined Japanese Patent Application (Kokai) 4-102235 in the known example, this embodiment has an advantage in that it is capable of coping with the tracking side as well.

Figure 25:
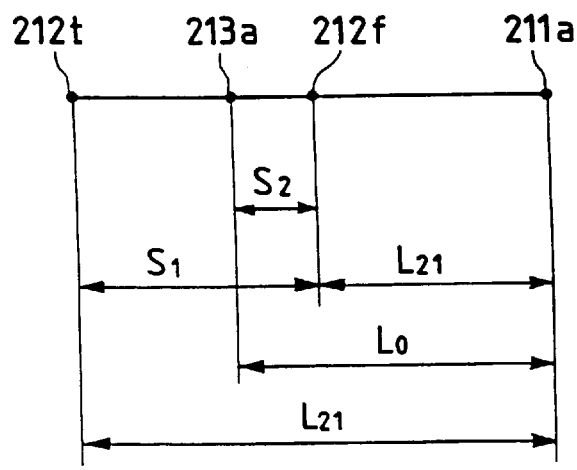
FIG. 25 is a diagram illustrating the positional relationships among respective points of application.

FIG. 25 is a diagram illustrating the positional relationships among the respective points of application 211a, 212f, and 212t and the position 213a of the center of gravity in the direction X tangential to the track in accordance with a modification of the objective-lens driving device of the present invention. This modification differs from the above-described embodiment in the relationships among the respective points of application 211a, 212f, and 212t and the position 213a of the center of gravity, and the other aspects are similar to those of the above-described embodiment.

In this embodiment, various parts are arranged such that $|L_{21}-L_{22}|<|L_{21}|$, and $L_0$ is determined such that $L_{21} \geq L_0 \geq L_{22}$ (when $L_{21} \geq L_{22}$) or $L_{21} \leq L_0 \leq L_{22}$ (when $L_{21} \leq L_{22}$).

Figure 26:
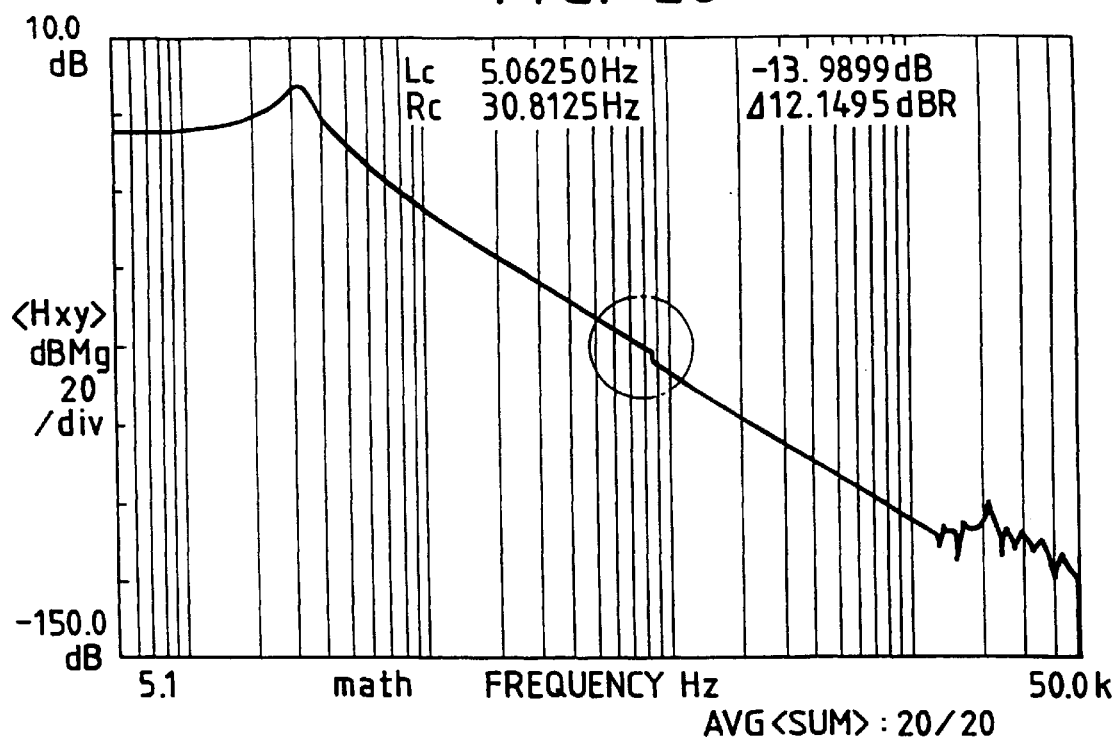
FIG. 26 is a diagram of a transmission characteristic in accordance with the third embodiment.
Figure 27:
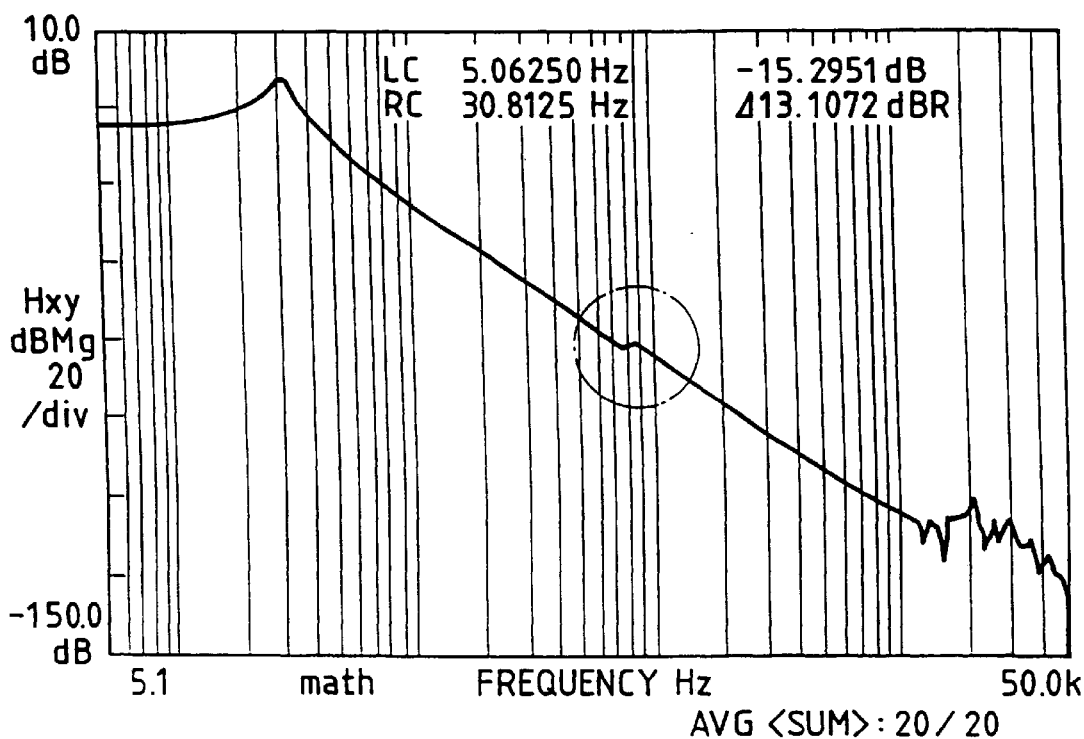
FIG. 27 is a diagram of a transmission characteristic in another example.
Figure 28:
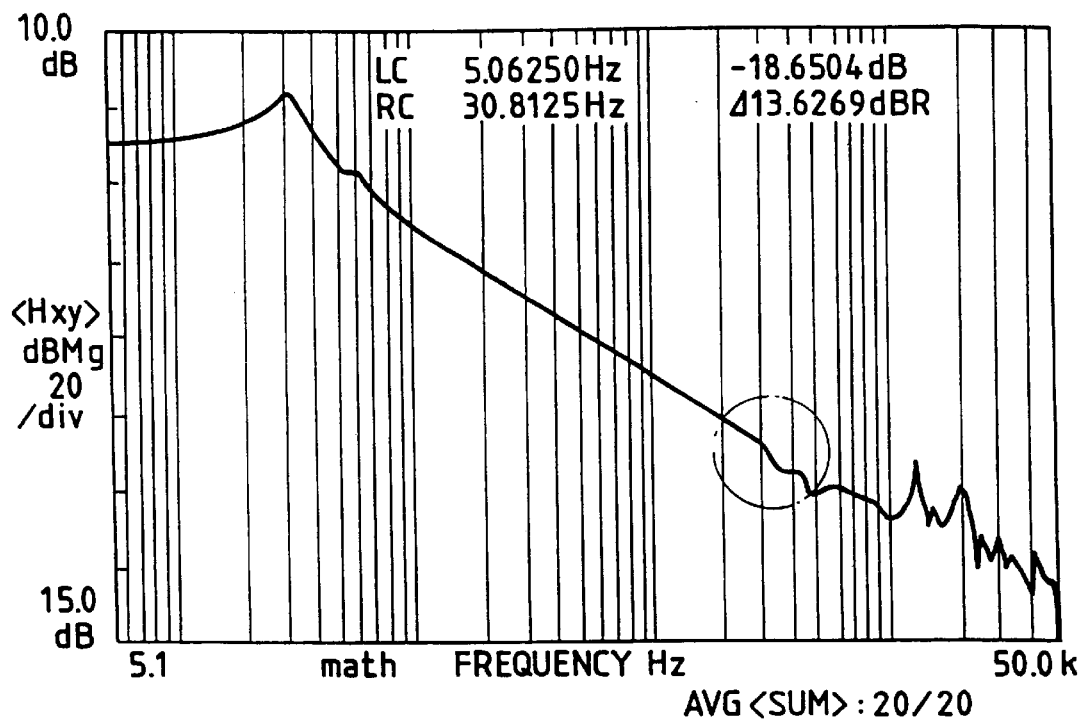
FIG. 28 is a diagram of a transmission characteristic in still another example.

Referring to FIGS. 26 to 28 as well, a description will be given of the effects of this modification.

FIG. 26 is a diagram of a transmission characteristic of an actuator in the focusing direction Z when settings were provided such that $L_0=200$ μm, $L_{21}=400$ μm, and $L_{22}=150$ μm, and $S_2=50$ μm, and $S_1=200$ μm. FIG. 27 is a diagram of a transmission characteristic of the actuator when the position 213a of the center of gravity and the position of the point of application 212f were arranged reversely, and the value of $S_2$ was similarly set to 50 μm. FIG. 28 is a diagram of a transmission characteristic of the actuator in the tracking direction Y when settings were provided such that $L_0=200$ μm, $L_{21}=400$ μm, and $L_{22}=250$ μm, and $S_2=50$ μm, and $S_1=200$ μm. Additionally, portions indicated by dotted-dash-line circles in FIGS. 26 to 28 show points of resonance.

As is apparent from FIG. 26, resonance of the frequency of rotation about the Y-axis with the position 213a of the center of gravity set as the center appeared in the portion indicated by the dotted-dash-line circle, but the resonance was sufficiently small. Accordingly, as shown in FIG. 25, if the distance S between the point of application 212t of the tracking-driving force and the point of application 212f of the resultant force ($F_{21}+F_{22}$), i.e., an actual focusing-driving force, is made short, and the position 213a of the center of gravity of the overall movable section 213 is disposed within that distance (S), it is possible to reduce both the distance $S_1$ between the position 213a of the center of gravity and the point of application 212t and the distance $S_2$ between the position 213a of the center of gravity and the point of application 212f as compared with conventional examples, thereby making it possible to sufficiently reduce the occurrence of unwanted resonance in the two directions.

As is apparent from FIG. 27, resonance of the frequency of rotation about the Y-axis with the position 213a of the center of gravity set as the center appeared in the portion indicated by the dotted-dash-line circle. If a comparison is made with FIG. 26, although the phase was reversed, the value of resonance was sufficiently small. As is apparent from FIG. 28, resonance of the frequency of rotation about the Z-axis with the position 213a of the center of gravity set as the center appeared in the portion indicated by the dotted-dash-line circle, but the resonance was sufficiently small. Accordingly, even if the position 213a of the center of gravity of the overall section 213 is not disposed between the point of application 212t of the tracking-driving force and the point of application 212f of the actual focusing-driving force (resultant force), insofar as $S_1$ and $S_2$ are sufficiently small, it is possible to reduce the occurrence of unwanted resonance to a sufficiently small level. Thus, if $S_1$ and $S_2$ are made small, the unwanted resonance can be made sufficiently small by making S small, without adopting the above-described arrangement.

It should be noted that the present invention is not limited to the above-described embodiment, and may be implemented by adopting various modifications. For example, in order to control the values of the in-gap magnetic flux density $B_1$, and the leakage magnetic flux density $B_2$, the thickness, the shape and the like of one leg $214a$ of the yoke $214$ may be devised, and various values including $L_{21}$ and $L_{23}$ may be determined such that $L_{21}=L_{22}$.

In accordance with the third embodiment of the present invention detailed above, the following advantages are obtained.

Since the point of application of the resultant force of focusing-driving forces respectively occurring in and outside the magnetic gap is brought close to the point of application of the tracking-driving force, their distances with respect to the position of the center of gravity of the overall movable section can both be reduced. Therefore, it is possible to easily prevent the occurrence of unwanted resonance in both the focusing direction and the tracking direction.

Further, since the position of the center of gravity of the overall movable section is located between the point of application of the tracking-driving force and the point of application of the resultant force of the focusing-driving forces respectively occurring in and outside the magnetic gap, the distances between the position of the center of gravity of the overall movable section and the point of application of the resultant force and between the position of the center of gravity of the overall movable section and the point of application of the tracking-driving force are both made short. Therefore, it is possible to prevent the occurrence of unwanted resonance in both the focusing direction and the tracking direction.

Additionally, since various parts are arranged in such a manner as to satisfy the formulae: $|L_0-L_{22}|\leqq 50$ μm and $|L_0-L_{21}|\leqq 200$ μm, it is possible to reduce unwanted resonance.

Furthermore, since the arrangement provided is such that the focusing coil and the tracking coils are disposed in a single magnetic circuit, and the point of application of the tracking-driving force, the point of application of the resultant force of focusing-driving forces respectively occurring in and outside the magnetic gap, and the position of the center of gravity of the movable section are made to substantially coincide with each other, it is possible to make the device compact and thin. Hence, it is possible to realize a stable servomechanism in which unwanted resonance does not occur in both the focusing direction and the tracking direction.

Moreover, since the arrangement provided is such that the focusing coil and the tracking coils are disposed in a single magnetic circuit, the point of application of the tracking-driving force, the point of application of the resultant force of focusing-driving forces respectively occurring in and outside the magnetic gap, and the position of the center of gravity of the movable section are made to substantially coincide with each other by selecting the values of $L_0$, $L_{21}$, $L_{22}$, $L_{23}$, $B_1$, and $B_2$ in such a manner as to satisfy the aforementioned formula, it is possible to make the device compact and thin. Hence, it is possible to realize a stable servomechanism in which unwanted resonance does not occur in both the focusing direction and the tracking direction. In addition, since the values of $L_0$, $L_{21}$, $L_{22}$, $L_{23}$, $B_1$, and $B_2$ can be selected as required, design of a high degree of freedom is possible. Also, since the present invention can be arranged on the basis of magnetic flux density which is easier to measure than the driving force, the design of various parts is facilitated.

Figure 1:
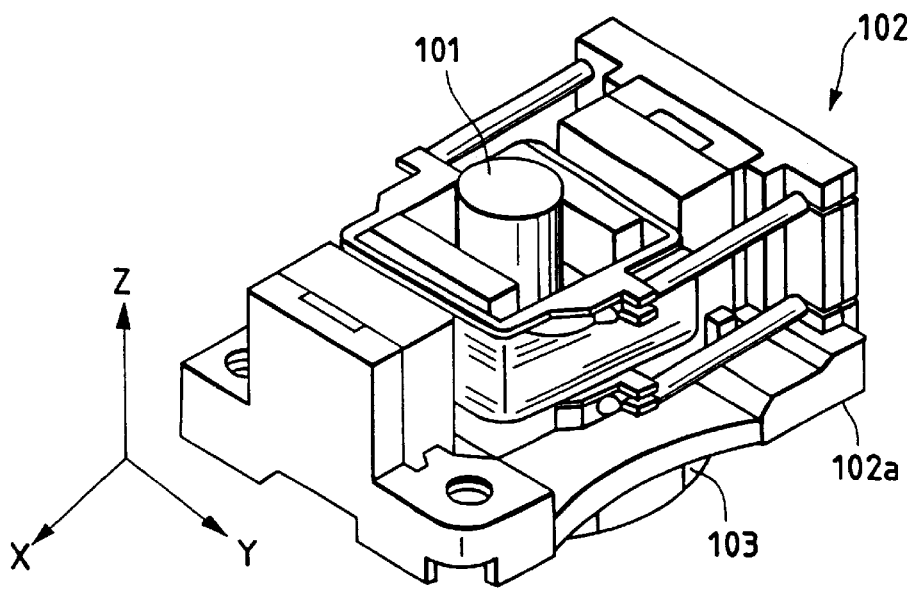
FIG. 1 is a perspective view of an objective-lens driving device for describing a conventional mechanism for adjusting the inclination of an objective lens.
Figure 2:
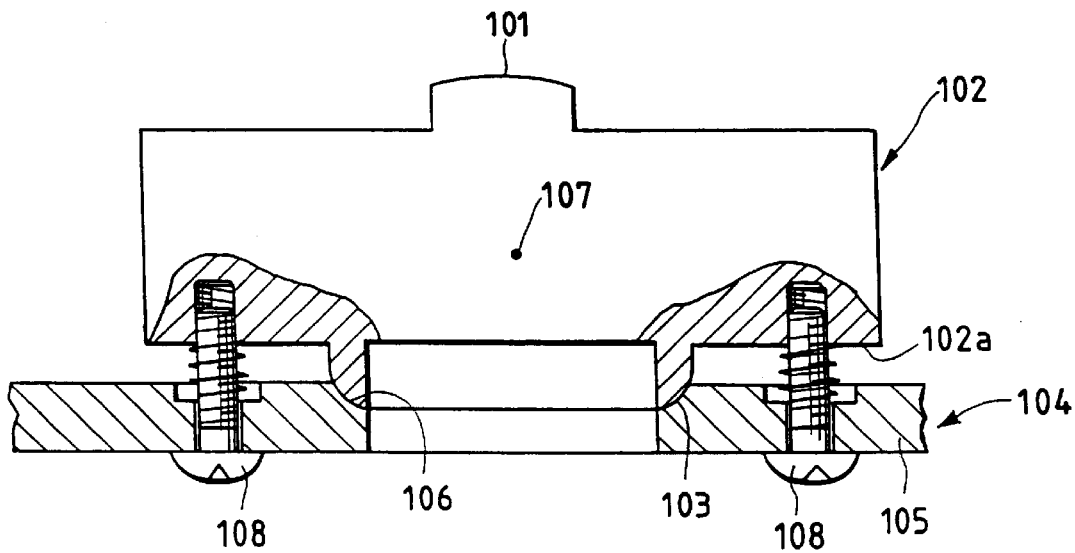
FIG. 2 is a cross-sectional view of the conventional mechanism for adjusting the inclination of an objective lens.
Figure 3:
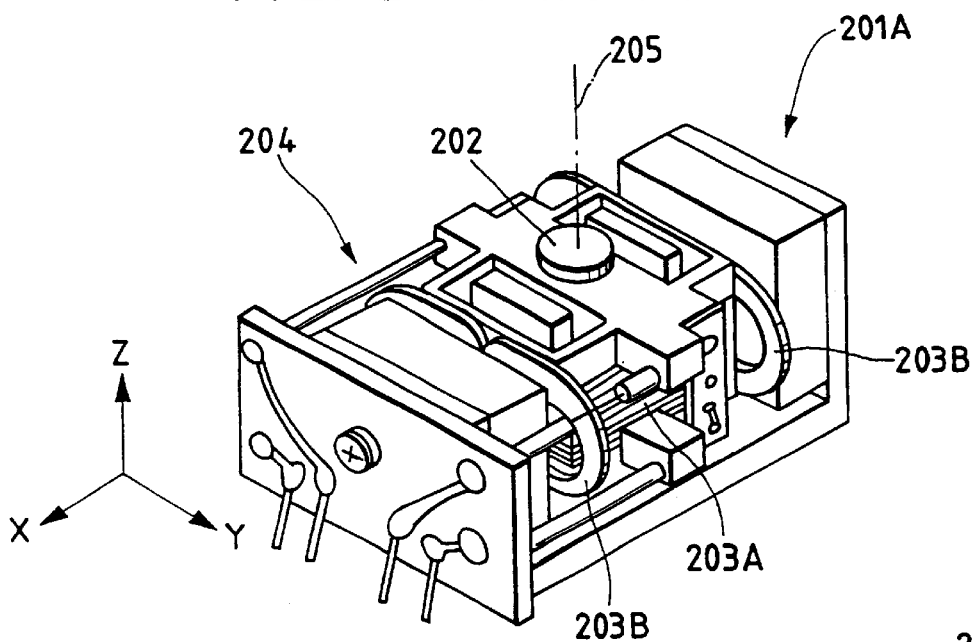
FIG. 3 is a perspective view of another conventional mechanism for adjusting the inclination of an objective lens.
Figure 4:
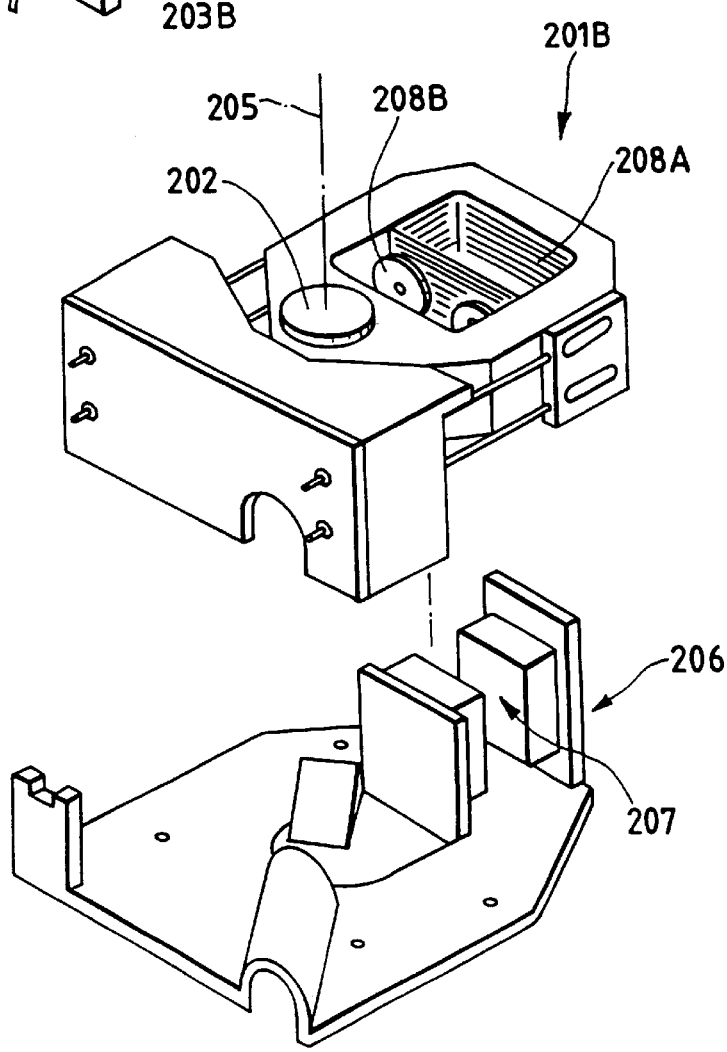
FIG. 4 is a perspective view of still another conventional mechanism for adjusting the inclination of an objective lens.
Figure 5A:
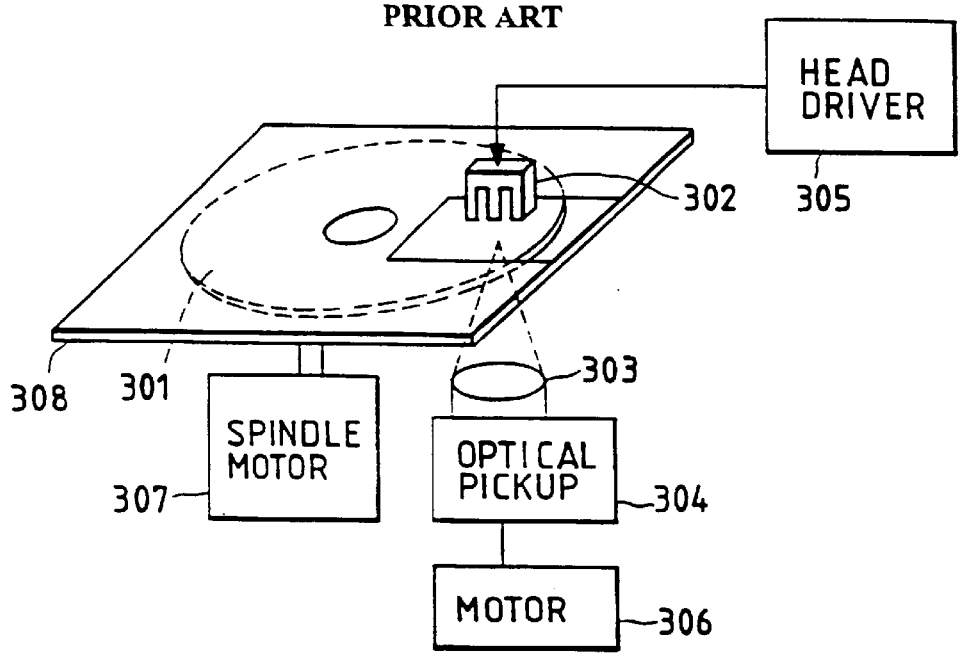
FIG. 5A is a schematic diagram illustrating an optical disk apparatus of a cartridge type.
Figure 5B:
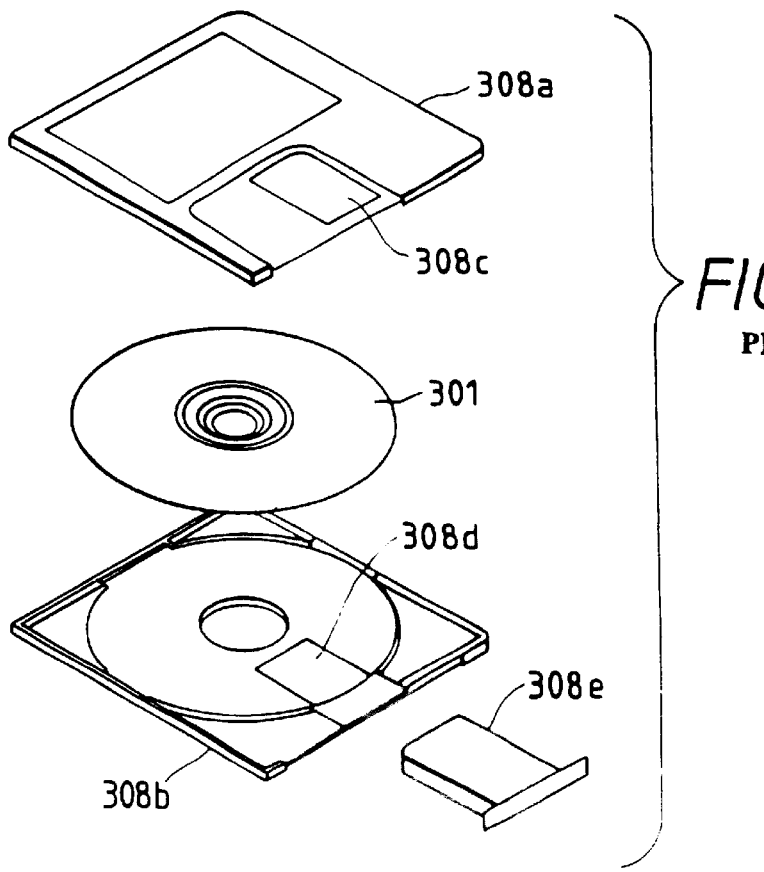
FIG. 5B is an exploded perspective view illustrating a schematic arrangement of an optical disk and a cartridge.

Furthermore, as shown in FIG. 4, in the case that the objective-lens driving device is made thin by arranging the magnetic circuit of the driving device within the window area of the lower shell of the optical disk, the magnetic circuit is required to be minimized. If the symmetry of the magnetic circuit is unbalanced, undesired resonance may occur. According to the invention, this undesired resonance is prevented.

Fourth Embodiment

Hereafter, a description will be given of a fourth embodiment of the present invention with reference to the drawings.

Figure 29:
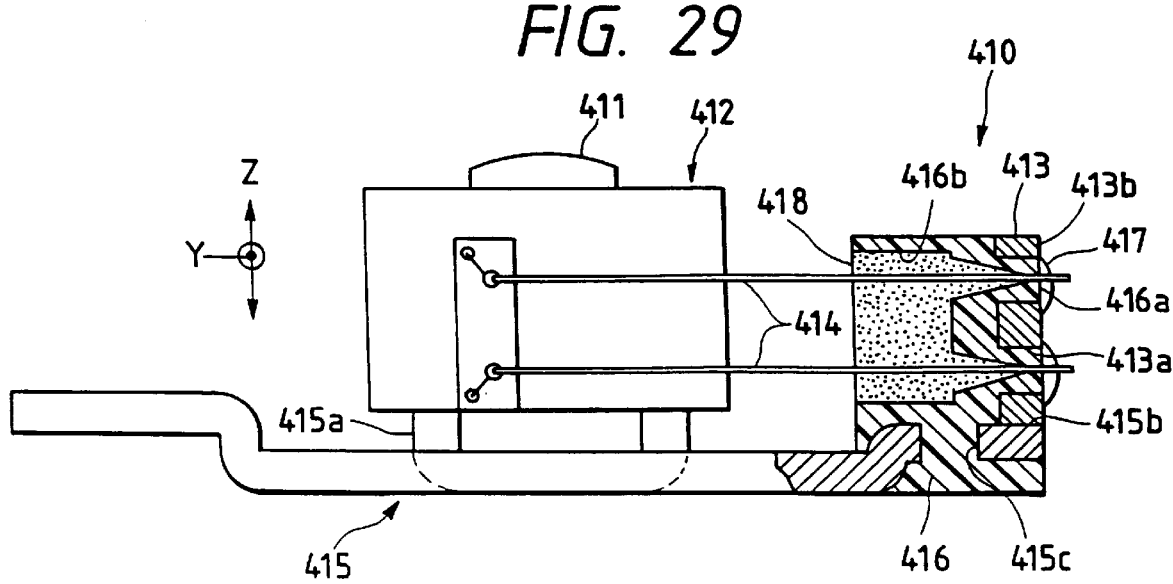
FIG. 29 is a side view of an objective-lens driving device in accordance with a fourth embodiment of the present invention.

FIG. 29 is a side view illustrating another example of the objective-lens driving device in accordance with the fourth embodiment of the present invention.

As shown in the drawing, an objective-lens driving device $410$ in this embodiment is comprised of a movable section $412$ including an objective lens $411$ and unillustrated coils for generating driving forces in predetermined directions Y and Z; a plurality of (in this embodiment, four) wires $414$ serving as resiliently supporting members for supporting the movable section $412$ in a cantilevered manner and also serving as paths for supplying electric current to the coils; a printed circuit board $413$ electrically connected to fixed ends of the wires $414$; a yoke base $415$ for producing the driving forces; and an intermediate member $416$ for fixing the printed circuit board $413$ and the yoke base $415$ by molding in a state in which the printed circuit board $413$ and the yoke base $415$ are positioned relative to each other.

The movable section $412$ has an unillustrated lens holder to which an objective lens $402$ is secured, and a focusing coil and tracking coils (not shown) for driving the objective lens $402$ in the focusing direction Z and the tracking direction Y are arranged in the lens holder.

Figure 30:
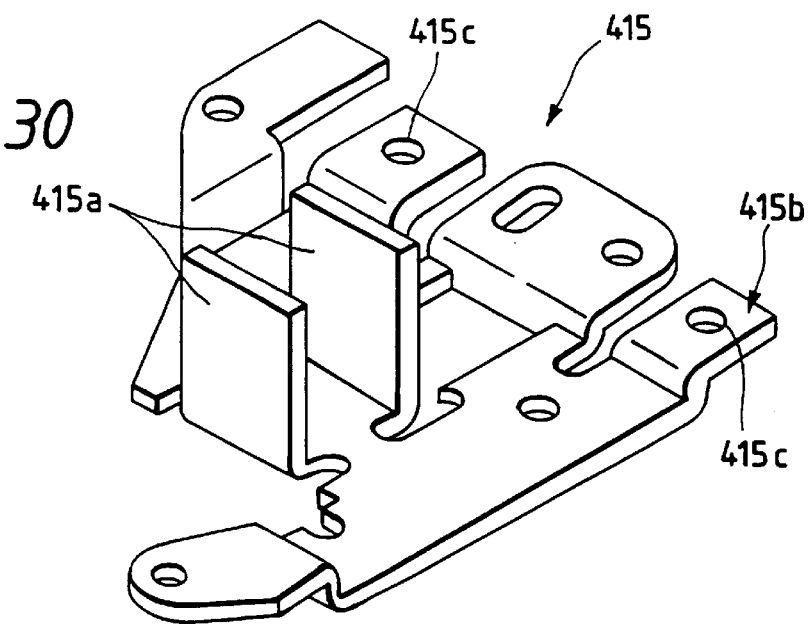
FIG. 30 is a perspective view of a yoke in accordance with the fourth embodiment.

As shown in the perspective view in FIG. 30, the yoke base $415$ is formed as a substantially U-shaped yoke portion $415a$ and a substantially Z-shaped placing portion $415b$ for placing the printed circuit board $413$ thereon are formed integrally by press-working a metal plate. The placing portion $415b$ is provided with through holes $415c$ for strengthening a joining force with respect to the intermediate member $416$.

As shown in FIG. 29, the printed circuit board $413$ has four through holes $413a$, which also serve as through holes for the wires $414$, so as to strengthen the joining force between the printed circuit board $413$ and the intermediate member $416$. On an outer surface $413b$ of the printed circuit board $413$, soldered land portions which are provided with plating are respectively formed around the through holes $413a$ for connecting external connecting cables.

The intermediate member $416$ is formed of an injection molding member such as a plastic resin. When this intermediate member $416$ is formed by injection molding, the printed circuit board $413$ and the yoke base $415$ are secured to each other. In addition, when the intermediate member $416$ is formed, guide holes $416a$ for the insertion of the wires $414$, as well as a damping-member accommodating portion $416b$ for filling a damping member $418$ such as silicone in the vicinities of the guide holes $416a$, are also formed.

Next, also referring to FIGS. 31 to 34, a description will be given of a method of manufacturing the objective-lens driving device $410$ in this embodiment.

Figure 31:
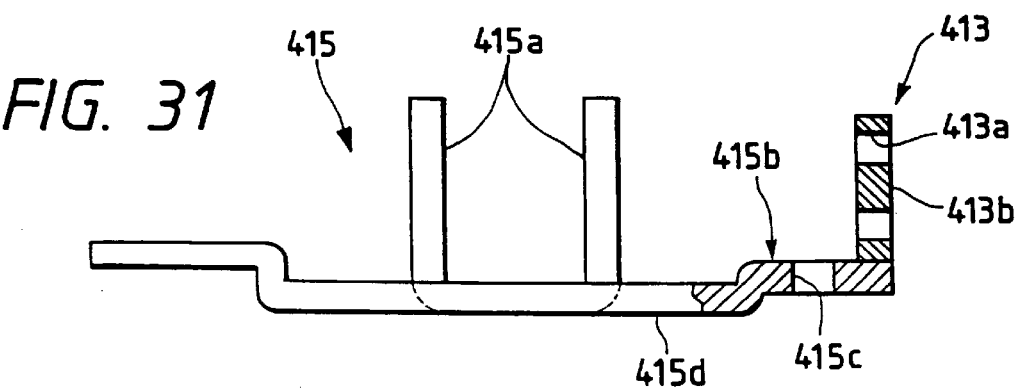
FIG. 31 is a side view illustrating a method of fabrication in accordance with the fourth embodiment.

First, as shown in FIG. 31, the printed circuit board $415$ and the yoke base $415$ formed by press working are disposed in a predetermined position in an unillustrated mold for injection molding, and are positioned. Through this positioning, the printed circuit board $413$ is placed on the placing portion $415b$ of the yoke base $415$, and the printed circuit board $413$ is held in an upright position by using a bottom $415d$ of the yoke base $415$ as a reference plane by means of the unillustrated mold.

Figure 32:
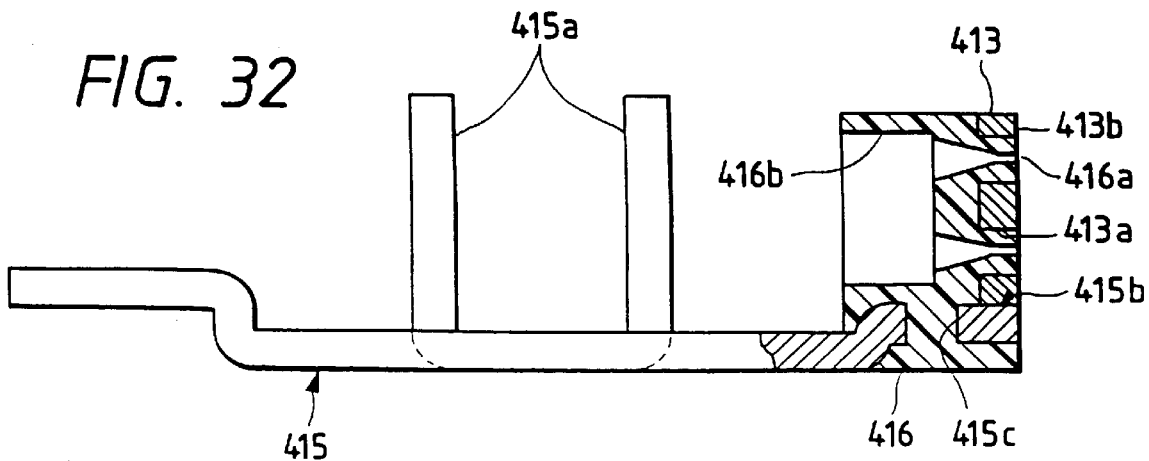
FIG. 32 is another side view illustrating the method of fabrication in accordance with the fourth embodiment.
Figure 33:
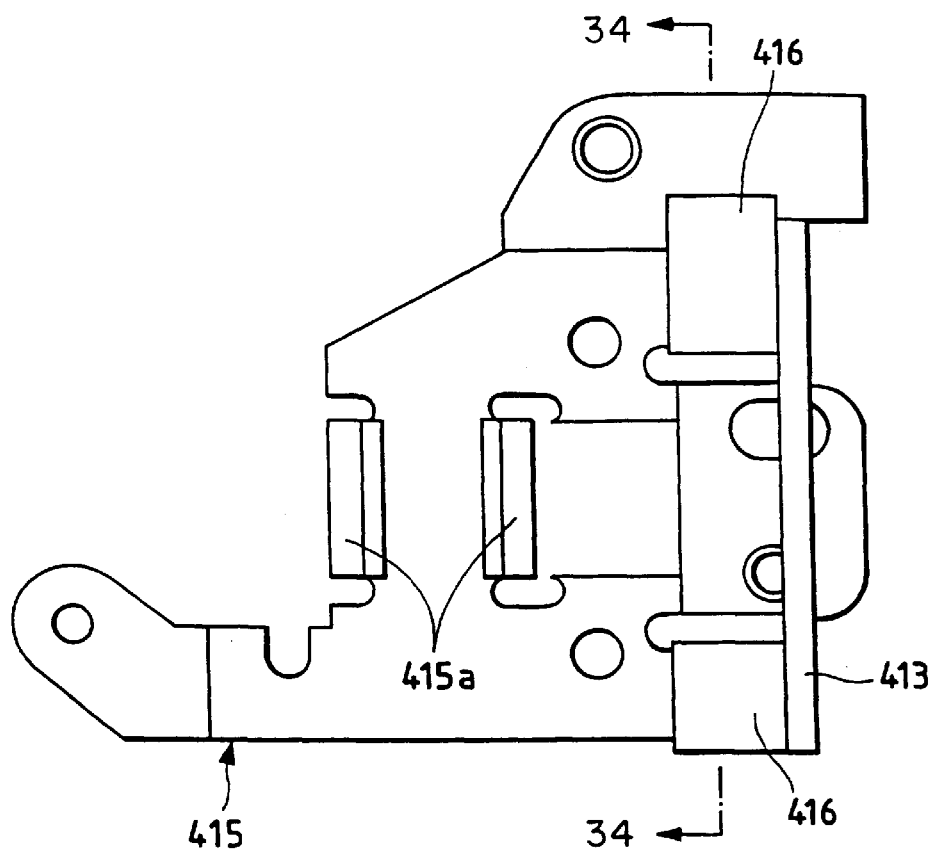
FIG. 33 is a plan view illustrating the method of fabrication in accordance with the fourth embodiment.
Figure 34:
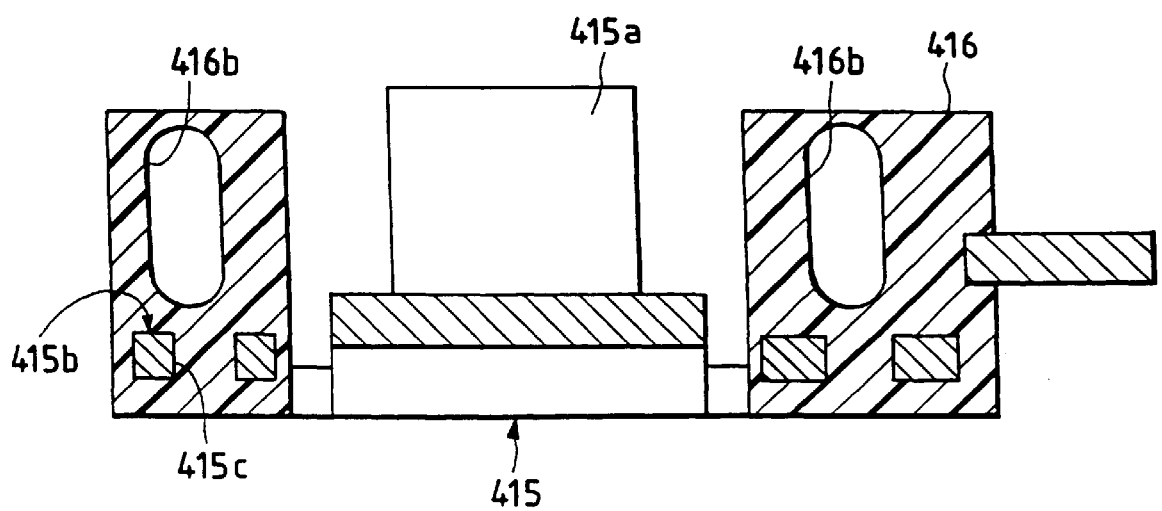
FIG. 34 is a cross-sectional view taken along the line C—C in FIG. 33.

In this state, the intermediate member $416$ is molded by injection molding, as shown in FIG. 32. Since the injection molding member for the intermediate member $416$ passes through the through holes $415c$ provided in the yoke base $415$ and the through holes $413a$ provided in the printed circuit board 413, and flows around to the opposite side, the printed circuit board 413 and the yoke base 415 are secured firmly to the intermediate member 416. In addition, when the intermediate member 416 is formed by injection molding, the guide holes 416a and the damping-member accommodating portion 416b are also formed. A plan view in this state is shown in FIG. 33, and a cross-sectional view taken along the line C—C in FIG. 33 is shown in FIG. 34.

Next, the four wires 414 are passed through the guide holes 416a formed in the intermediate member 416, and are connected to the soldered land portions formed on the outer surface 413b of the printed circuit board 413 by means of solder 417. The movable section 412 including the objective lens 411 and the unillustrated coils is secured to the distal ends of the wires 414 by means of soldering.

Subsequently, the damping member 418 is filled in the damping-member accommodating portion 416b formed in the intermediate member 416.

The yoke base 415, the intermediate member 416, and the printed circuit board 413 are assembled in the above-described manner.

According to this embodiment, since the yoke base 415 and the printed circuit board 413 are simultaneously secured when the intermediate member 416 is formed by injection molding, instead of securing the yoke base 415 and the intermediate member 416 as well as the intermediate member 416 and the printed circuit board 413 by means of an adhesive, screws, or the like, there is an advantage in that the number of component parts and auxiliary materials used decreases, and the number of assembling steps can also be reduced.

In addition, since the yoke base 415 and the printed circuit board 413 are positioned in the mold and are integrally formed by using the intermediate member 416, the relative positional accuracy becomes high.

Also, since the molding is effected by causing the intermediate member 416 to enter the through holes 413a of the printed circuit board 413, there is no lifting off of the printed circuit board 413 at the boundary between the intermediate member 416 and the through holes 413a in the printed circuit board 413 due to temperature changes, aged deterioration and the like. Hence, there is an advantage in that it is possible to prevent a change in the angle of the optical axis of the objective lens 411 and the occurrence of unwanted resonance due to the deterioration of the supporting balance.

Further, if the intermediate member 416 is formed by a color which easily reflects light, when the wires on the printed circuit board 413 are soldered by a noncontact soldering apparatus using a light beam, the light can be focused on the soldering land portions around them without being concentrated on the through holes 413a in the printed circuit board 413. Hence, there is an advantage in that wire soldering can be provided effectively.

Furthermore, since the vibration of the wires 414 is suppressed by the damping member 418 to dampen the unwanted resonance of the movable section 412, it becomes possible to drive the objective lens 411 more accurately.

It should be noted that the present invention is not limited to the above-described embodiment, and various modifications are possible. For instance, the printed circuit board 413 and the yoke base 415 many not contact each other insofar as relative positional accuracy can be ensured. Also, the damping member 418 may be provided on the distal end side of the wires 414 to suppress the vibration. In addition, the movable section may be supported on both sides by means of wires. In this case, it suffices if the printed circuit board is disposed on at least one fixed end side of the wires.

In accordance with the fourth embodiment of the present invention detailed above, the following advantages are obtained.

Since the bonding process and the screw-tightening process can be omitted in assembling the printed circuit board, the base, and the intermediate member, and the relative positional accuracy between the printed circuit board and the base can be improved, it is possible to provide an objective-lens driving device which facilitates fabrication, and in which the objective lens can be driven with high accuracy.

Since part of the intermediate member enters the through holes at the time of molding the intermediate member, the joining force between the printed circuit board and the base is strengthened, thereby improving the reliability.

Since the printed circuit board can be prevented from becoming lifted off in the vicinities of the fixed ends of the resiliently supporting members, it is possible to prevent changes in the angle of the optical axis of the objective lens and the occurrence of unwanted resonance due to the deterioration of the supporting balance.

Since the unwanted resonance of the movable section is dampened by suppressing the vibration of the resiliently supporting members by means of the damping member, the objective lens can be driven with greater accuracy.

Since the base is formed integrally with the yoke, the base can be fabricated easily.

What is claimed is:

1. An optical pickup device comprising:
   an objective-lens driving device for driving an objective lens, which includes a magnetic circuit;
   an optical system for transmitting and receiving light to and from said objective lens; and
   a base having a through hole formed therein, on which said objective-lens driving device and said optical system are mounted, and wherein at least a portion of said magnetic circuit of said objective-lens driving device is accommodated in said through hole.

2. An optical pickup device as claimed in claim 1, further comprising a movable plate integrally formed with a yoke as said magnetic circuit, said yoke having a substantially U-shaped cross-section, on which said objective-lens driving device is mounted.

3. An optical pickup device as claimed in claim 2, wherein an inclination of said movable plate is adjusted relative to said base.

* * * * *